United States Patent
Shimizu et al.

[11] Patent Number: 5,490,068
[45] Date of Patent: Feb. 6, 1996

[54] SUSPENSION CONTROL SYSTEM FOR AUTOMOTIVE VEHICLE INCLUDING APPARATUS FOR CONTROLLING SHOCK ABSORBER DAMPING FORCE COEFFICIENT

[75] Inventors: Hiroyuki Shimizu; Makoto Kimura; Toru Takahashi; Junichi Emura; Shinobu Kakizaki, all of Kanagawa, Japan

[73] Assignee: Atsugi Unisia Corporation, Kanagawa, Japan

[21] Appl. No.: 921,052

[22] Filed: Jul. 29, 1992

[30]  Foreign Application Priority Data

Jul. 30, 1991 [JP] Japan ................................. 3-189960
Aug. 6, 1991 [JP] Japan ................................. 3-196801
Aug. 22, 1991 [JP] Japan ................................. 3-210854
Aug. 27, 1991 [JP] Japan ................................. 3-214988

[51] Int. Cl.$^6$ ................................................ B60G 17/06
[52] U.S. Cl. ........................ 364/424.05; 280/707; 280/840
[58] Field of Search ..................... 364/424.05; 280/688, 280/707, 840, DIG. 1, 6.12

[56] References Cited

U.S. PATENT DOCUMENTS

| | | | |
|---|---|---|---|
| 4,765,648 | 8/1988 | Mander et al. | 280/707 |
| 4,809,179 | 2/1989 | Klinger et al. | 364/424.05 |
| 5,015,358 | 4/1991 | Takase et al. | 364/424.05 |
| 5,041,977 | 8/1991 | Kawabata | 364/424.05 |
| 5,062,657 | 11/1991 | Majeed | 280/707 |
| 5,071,157 | 12/1991 | Majeed | 280/707 |
| 5,071,159 | 12/1991 | Kamimura et al. | 280/707 |
| 5,072,392 | 12/1991 | Taniguchi | 364/424.05 |
| 5,072,965 | 12/1991 | Wada et al. | 280/707 |
| 5,097,419 | 3/1992 | Lizell | 364/424.05 |
| 5,104,143 | 4/1992 | Yonekawa | 280/707 |
| 5,174,598 | 12/1992 | Sato et al. | 280/707 |
| 5,176,399 | 1/1993 | Takehara et al. | 280/707 |
| 5,203,584 | 4/1993 | Butsuen et al. | 280/707 |
| 5,235,529 | 8/1993 | Hanson et al. | 364/424.05 X |

FOREIGN PATENT DOCUMENTS

| | | |
|---|---|---|
| 4139692 | 6/1992 | Germany . |
| 3941909 | 1/1993 | Germany . |
| 59-117510 | 8/1984 | Japan . |
| 61-163011 | 7/1986 | Japan . |
| 64-60411 | 3/1989 | Japan . |

*Primary Examiner*—Collin W. Park
*Attorney, Agent, or Firm*—Ronald P. Kananen

[57] ABSTRACT

A suspension control system for an automotive vehicle is disclosed in which, in each shock absorber, interposed between the vehicular body and tire wheel, a damping coefficient varying adjuster is provided which changes a damping coefficient at either or both of piston stroke sides according to a control signal input thereto so that the damping coefficient is set to a target damping coefficient position, at lease one sprung mass acceleration sensor and at least one sprung mass speed sensor are provided, and the control unit is provided which outputs the control signal to the damping coefficient varying means according to a result of determination of whether the vertical sprung mass acceleration exceeds a predetermined threshold value and according to a direction and magnitude of the sprung mass speed so that the damping coefficient at either or both of the stroke sides is controlled to a target damping coefficient position.

29 Claims, 26 Drawing Sheets

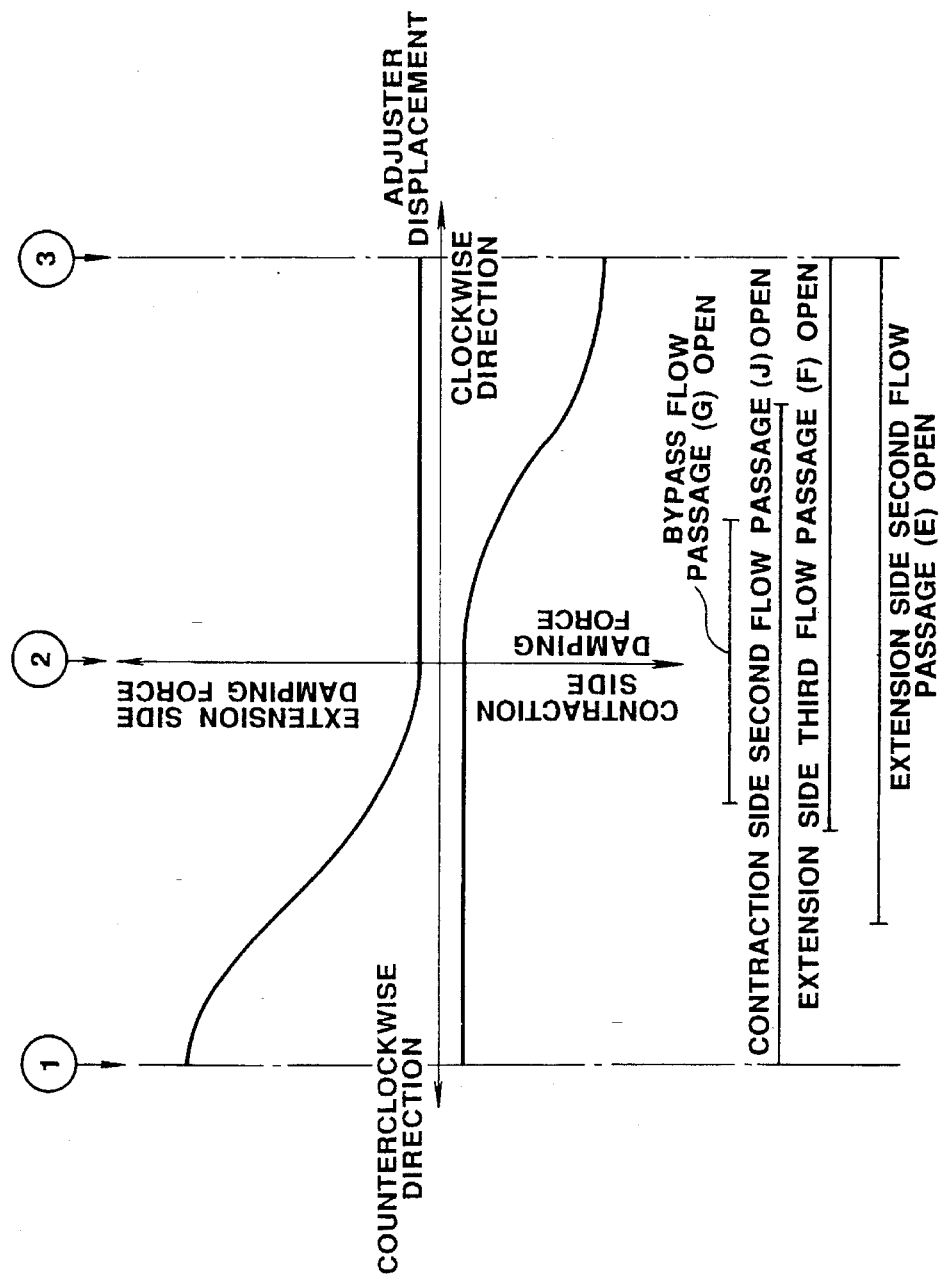

FIG.7(A)  FIG.7(B)  FIG.7(C)
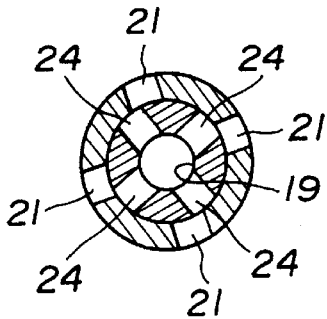 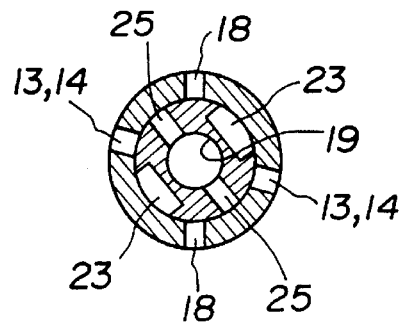 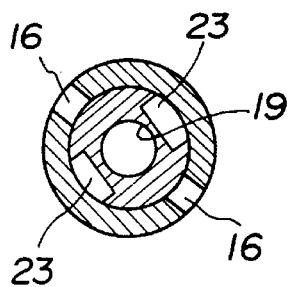
FIG.8(A)  FIG.8(B)  FIG.8(C)
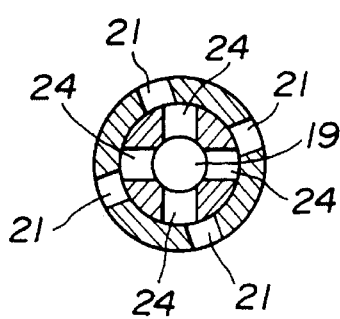 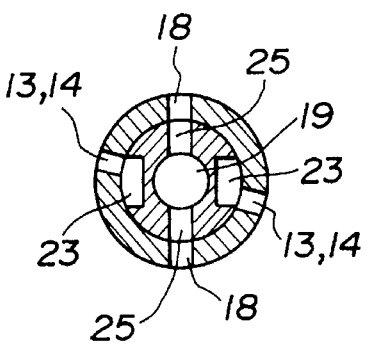 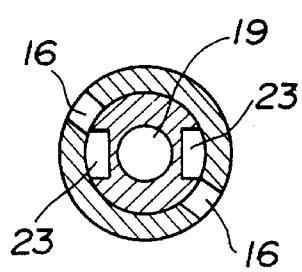
FIG.9(A)  FIG.9(B)  FIG.9(C)
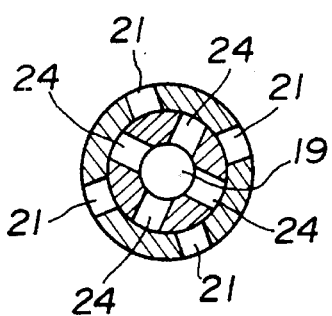 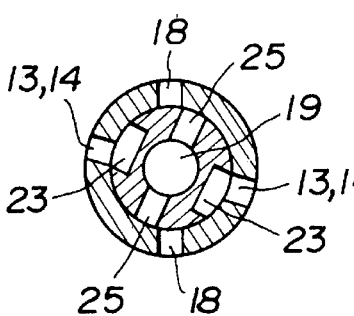 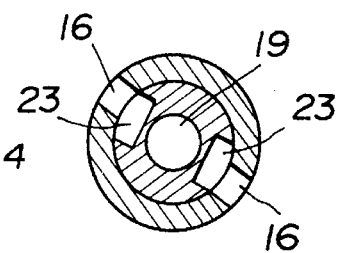

VEHICLE SPEED (Km/h)

SUSPENSION CONTROL SYSTEM FOR AUTOMOTIVE VEHICLE INCLUDING APPARATUS FOR CONTROLLING SHOCK ABSORBER DAMPING FORCE COEFFICIENT

BACKGROUND OF THE INVENTION

1. Field of the Invention

The present invention relates to a suspension control system for an automotive vehicle for controlling a damping coefficient of a shock absorber (also called damper, but hereinafter referred to as the shock absorber). The present invention, particularly, relates to the suspension control system described above in which each of the shock absorbers is provided with multiple variable damping coefficients stages.

2. Description of the Background Art

Japanese Utility Model Registration Application First Publication No. Showa 59-117510 published on Aug. 8, 1984 exemplifies a previously proposed vehicular suspension control system which carries out a rolling control for the vehicular body.

In the previously proposed vehicular suspension system, at least one of a damping force of the shock absorber and a spring constant of an pneumatic spring is increased on the basis of a signal derived from a lateral acceleration sensor which detects an applied acceleration in a vehicular width direction so as to hold the shock absorber in a hard damping force condition, thus suppressing vehicle roll.

However, since the suspension system described above maintains the shock absorber in the hard damping force condition during the rolling control, vibrations generated on an unsprung mass are transmitted to the vehicular body when the vehicle runs on a rough road during the rolling control so that vehicular comfort is deteriorated.

On the other hand, Japanese Patent Application First Publication No. Showa 64-60411 published on Mar. 7, 1989 exemplifies another previously proposed vehicular suspension control system.

In the latter previously proposed suspension control system, the damping force generated in the shock absorber is detected, a relative displacement between a sprung mass and unsprung mass is estimated according to the damping force signal intensity and the condition of the road on which the vehicle is running is determined according to a period of time at which the relative displacement exceeds a predetermined threshold value. When a flat or smooth road is determined, the shock absorber is controlled toward a low damping coefficient side during a predetermined interval of time. When a rough road is determined, the shock absorber is controlled toward a high damping coefficient side during the predetermined interval of time.

However, since in the latter previously proposed vehicular suspension control system the damping force control is carried out according to a signal (generated damping force of the shock absorber) mixed with the unsprung mass signal component and sprung mass signal component, a correct determination of whether it is time to control the vibration suppression or to absorb the vibrations so as to provide a preferable vehicular comfort cannot be made. Consequently, the vehicular ride comfort and steering stability are deteriorated.

In addition, since it requires a finite interval of Lime to determine the road surface condition, a time lag occurs in the damping coefficient control and thus causes a worsening of the vehicular ride comfort and steering stability.

SUMMARY OF THE INVENTION

It is, therefore, a principal object of the present invention to provide an improved suspension control system which can accurately detect unsprung mass and sprung mass states, which can carry out an appropriate damping coefficient control, and which can enhance both of a vehicular comfort and steering stability with fast control responsive characteristic achieved.

The above-described object can be achieved by providing a suspension control system for an automotive vehicle, comprising: a) at least one shock absorber, interposed between a vehicle body and a tire wheel, having a piston member and a damping coefficient varying means therein, said damping coefficient varying means operatively changing its position in response to a control signal so that a damping coefficient of at least one of both extension and contraction stroke sides of the piston member is set to a target damping coefficient position; b) at least one sprung mass acceleration detecting means for detecting a vertical sprung mass acceleration and outputting a vertical sprung mass acceleration signal indicative thereof; c) at least one sprung mass speed detecting means for detecting the sprung mass speed and for outputting the sprung mass speed indicative thereof; d) setting means for previously setting a threshold value for the vertical sprung mass acceleration signal value; c) determining means for determining whether the vertical sprung mass acceleration signal value is below the predetermined threshold value; and, f) controlling means for outputting the control signal to the damping coefficient varying means according to a result of determination of the determining means and according to a magnitude and direction of the sprung mass speed so as to control the damping coefficient to the target damping coefficient position.

BRIEF DESCRIPTION OF THE DRAWINGS

FIG. 6 is an explanatory view of the varied damping coefficients at extension and contraction stroke sides according to the rotation position of an adjuster in the shock absorber.

FIGS. 7(A)–7(C), 8(A)–8(C), and 9(A)–(C) are top views of the adjuster and communication holes for explaining the positions of the adjuster with respect to the communication hole.

DESCRIPTION OF THE PREFERRED EMBODIMENTS

Reference will hereinafter be made to the drawings in order to facilitate a better understanding of the present invention.

First Preferred Embodiment

Figure 1:
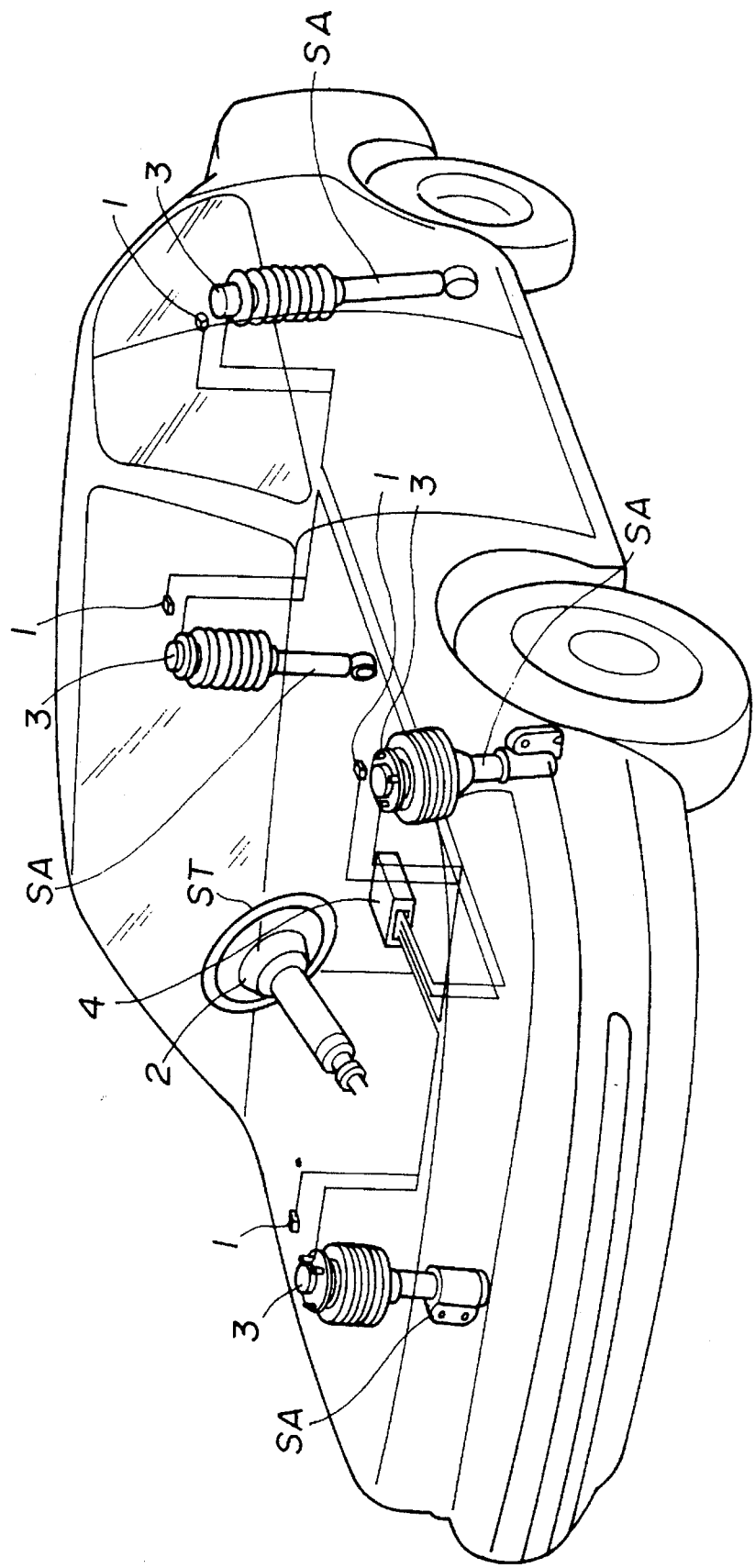
FIG. 1 is an overall view of a suspension control system for an automotive vehicle.

FIG. 1 shows a system configuration of a vehicular suspension control system in a first preferred embodiment according to the present invention.

As shown in FIG. 1, four shock absorbers SA are interposed between a vehicular body and respective tire wheels. A vertical (upward and downward with respect to the vehicular body) acceleration sensor (hereinafter, referred to as a vertical G sensor) is disposed on a part of the vehicle body adjacent to each shock absorber SA. In addition, a steering sensor 2 is attached onto a steering wheel ST. A control unit 4 is installed in the vehicle body adjacent to a vehicular driver seat for receiving signals from each sensor 1 and 2 and for outputting a drive control signal to a pulse motor 3 of each shock absorber SA.

Figure 2:
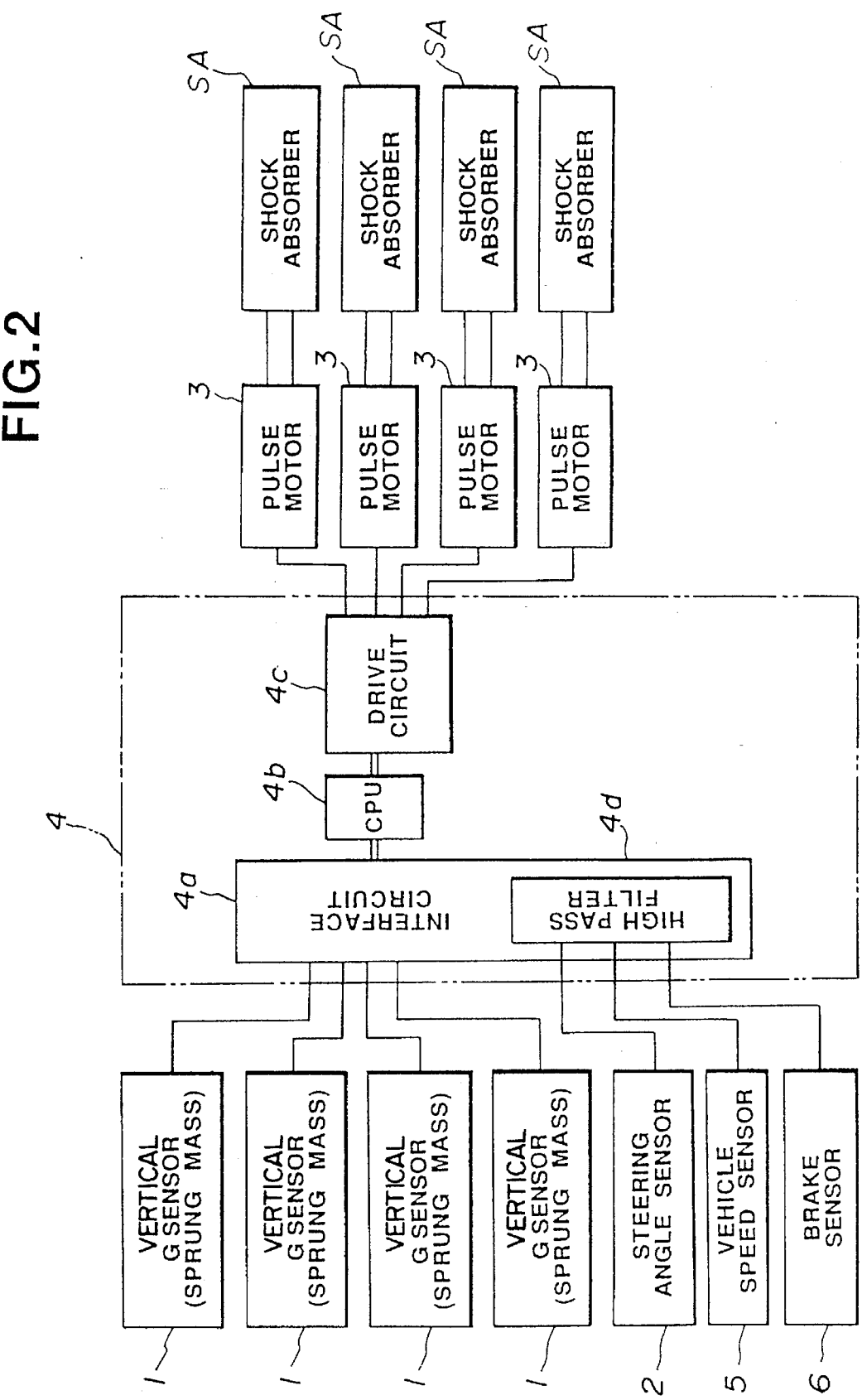
FIG. 2 is a circuit block diagram of the suspension control system in a first preferred embodiment according to the present Invention.

FIG. 2 shows a circuit block diagram of the suspension control system in the first preferred embodiment according to the present invention.

The control unit 4 includes: an interface circuit 4a; a CPU (Central Processing Unit) 4b; and a drive circuit 4c. The interface circuit 4a receives sensor signals from a vehicle speed sensor 5 and brake sensor 6 in addition to each of the other sensors 1 and 2. In addition, the interface circuit 4a includes a high pass filter 4d. Each sensor signal from the vertical G sensors 1 is directly input to the CPU via the interface circuit 4a and, on the other hand, is input to the CPU via the high pass filter circuit 4d of the interface circuit 4d. It is noted that the high pass filter 4d serves to pass only high harmonic frequency components including the unsprung resonant frequency components from among the vertical acceleration signals derived from the vertical G sensors 1.

Figure 3:
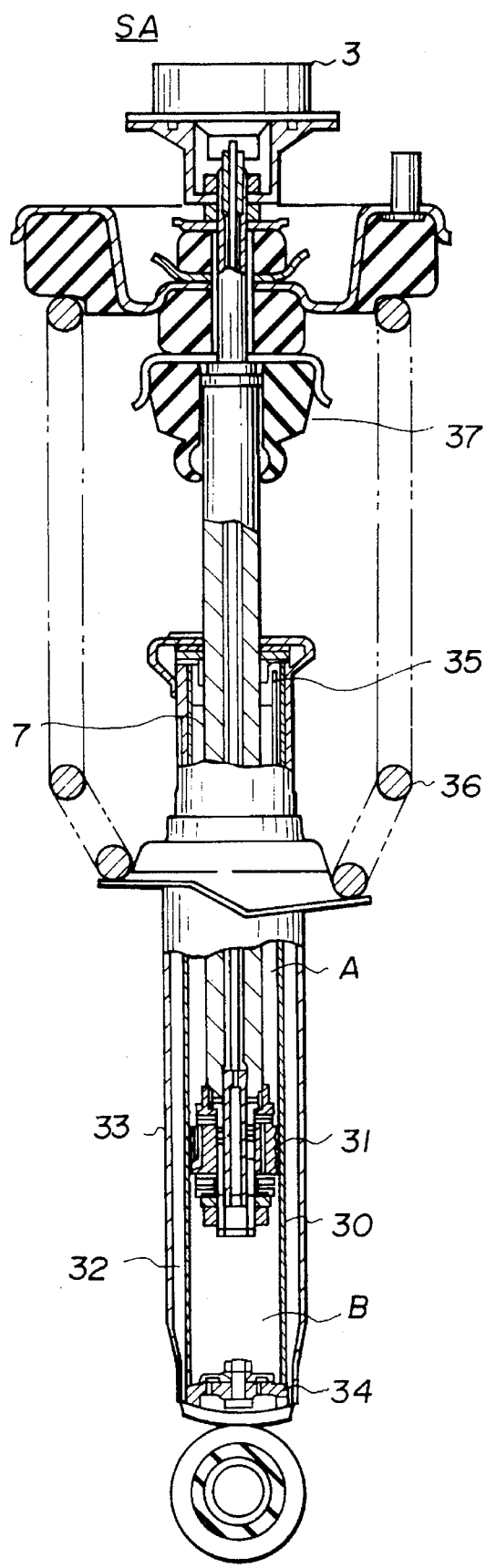
FIG. 3 is an enlarged cross sectional view of a shock absorber SA used in the first preferred embodiment shown in FIG. 2.

Next, FIG. 3 shows a cross-sectional structure of each shock absorber SA.

The shock absorber SA shown in FIG. 8 includes: a cylinder 30; a piston 31 for defining both upper chamber and lower chamber A and B; an outer envelope 33 which forms a reservoir chamber 32 on the outer periphery of the cylinder 30; a base (or bottom base) 34 for defining the lower chamber B and reservoir chamber 32; a guide member 35 for guiding a slide movement of a piston rod 7 linked to the piston main body 32; a suspension spring 36 interposed between the outer envelope 33 and vehicular body; and a bumper rubber member (or bushing) 37.

Figure 4:
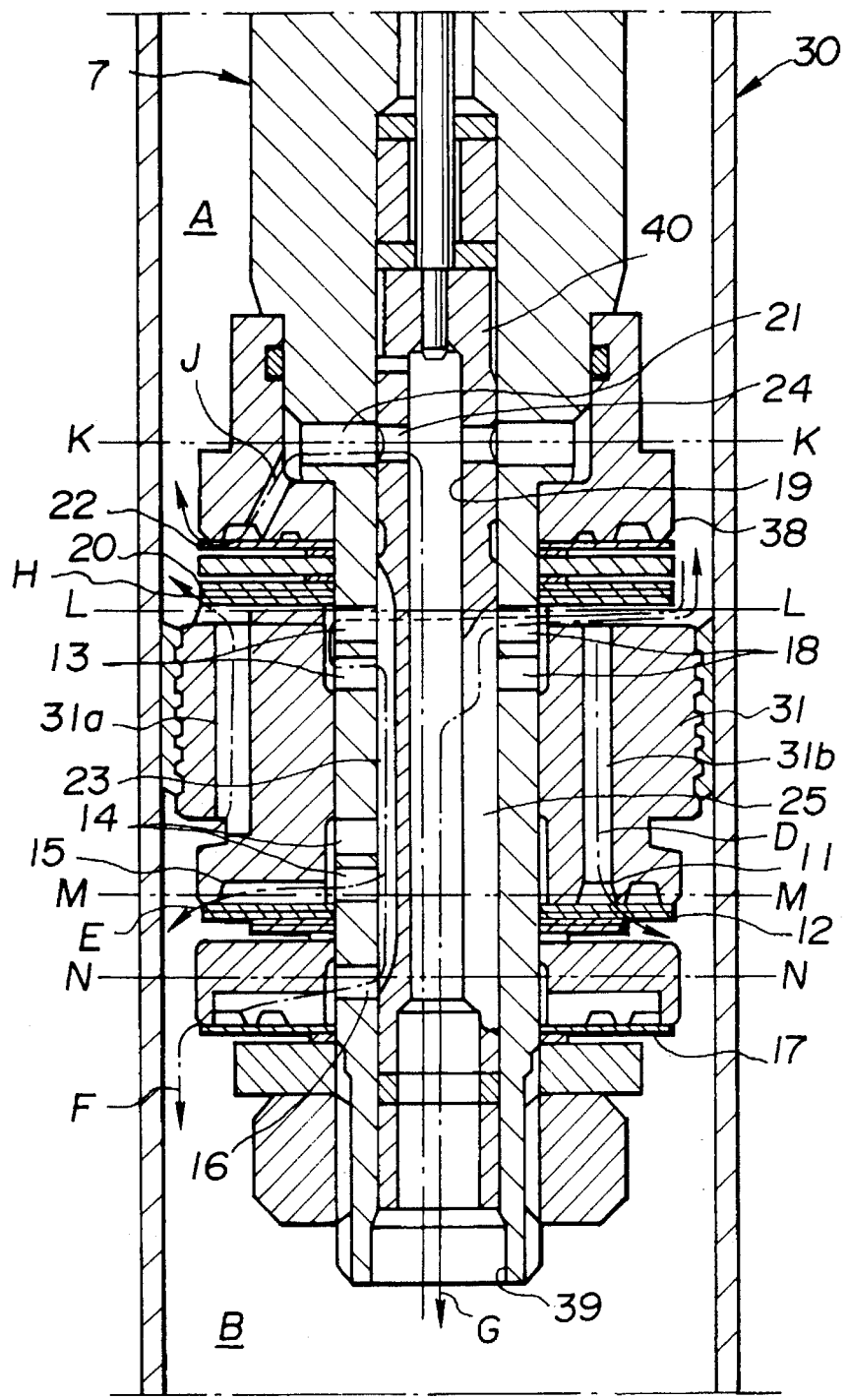
FIG. 4 is a cross-sectional view of a piston part in the shock absorber shown in FIG. 3.

FIG. 4 shows an enlarged cross-sectional view of the piston 31.

As shown in FIG. 4, penetrating holes 31a, 31b are formed in the piston 31. In addition, an extension stroke side damping valve 12 and contraction stroke side damping valve 20 are installed which open or close the respective penetrating holes 81a, 31b, respectively.

A communication hole 39 is formed in a tip of a piston rod 7, the piston rod 7 penetrating through the piston 31. The communication hole 39 serves to communicate between the upper chamber A and lower chamber B. Furthermore, the adjuster 40 in FIG. 4 serves to adjust a flow passage area of the communication hole 39. An extension stroke side check valve 17 and contraction stroke side check valve 22 are installed which enable and disable the flow in the communication hole 39 according to the direction of flow of the fluid. As shown in FIG. 3, the adjuster 40 is rotatably fixed according to the drive of the pulse motor 3.

In addition, first port 21, second port 13, third port 18, fourth port 14, and fifth port 16 are formed on the tip of the piston rod 7. Numeral 38 in FIG. 4 denotes a retainer on which the contraction stroke side check valve 22 is seated.

On the other hand, the adjuster 40 is formed with a hollow portion 19, a first lateral hole 24 and second lateral hole 25. Furthermore, a longitudinal groove 23 is formed in an outer periphery of the adjuster 40. The first lateral hole 24 and second lateral hole 25 serve to communicate between the inner portion of the adjuster 40 and outer portion thereof.

Hence, four fluid flow passages are formed between the upper chamber A and lower chamber B as fluid flow communicable passages in the extension stroke:

1) an extension side first flow passage D from the penetrating hole 31b to the lower chamber B via an inner side of the opened extension side damping valve 12;

2) an extension side second flow passage E from the second port 13, longitudinal groove 23, and fourth port 14 to the lower chamber B via the outer periphery of the extension side damping valve 12;

3) an extension side third flow passage F from the second port 13, longitudinal groove 23, and fifth port 16 to the lower chamber B via the opened extension side check valve 17; and 4) a bypass flow passage G from the third port 18, second lateral hole 25, and hollow portion 19 to the lower chamber B.

On the other hand, as the fluid flow passages of the fluid in the contraction stroke, the following three passages are formed:

1) a contraction side first flow passage H from the penetrating hole 31a to the upper chamber A via the opened contraction side damping valve 20;

2) a contraction side second flow passage J from the hollow portion 19, first lateral hole 24, and first port 21 to the upper chamber A via the opened contraction side check valve 22; and 3) a bypass flow passage G from the hollow portion 19, second lateral hole 25, and third port 18 to the upper chamber A.

Figure 5:
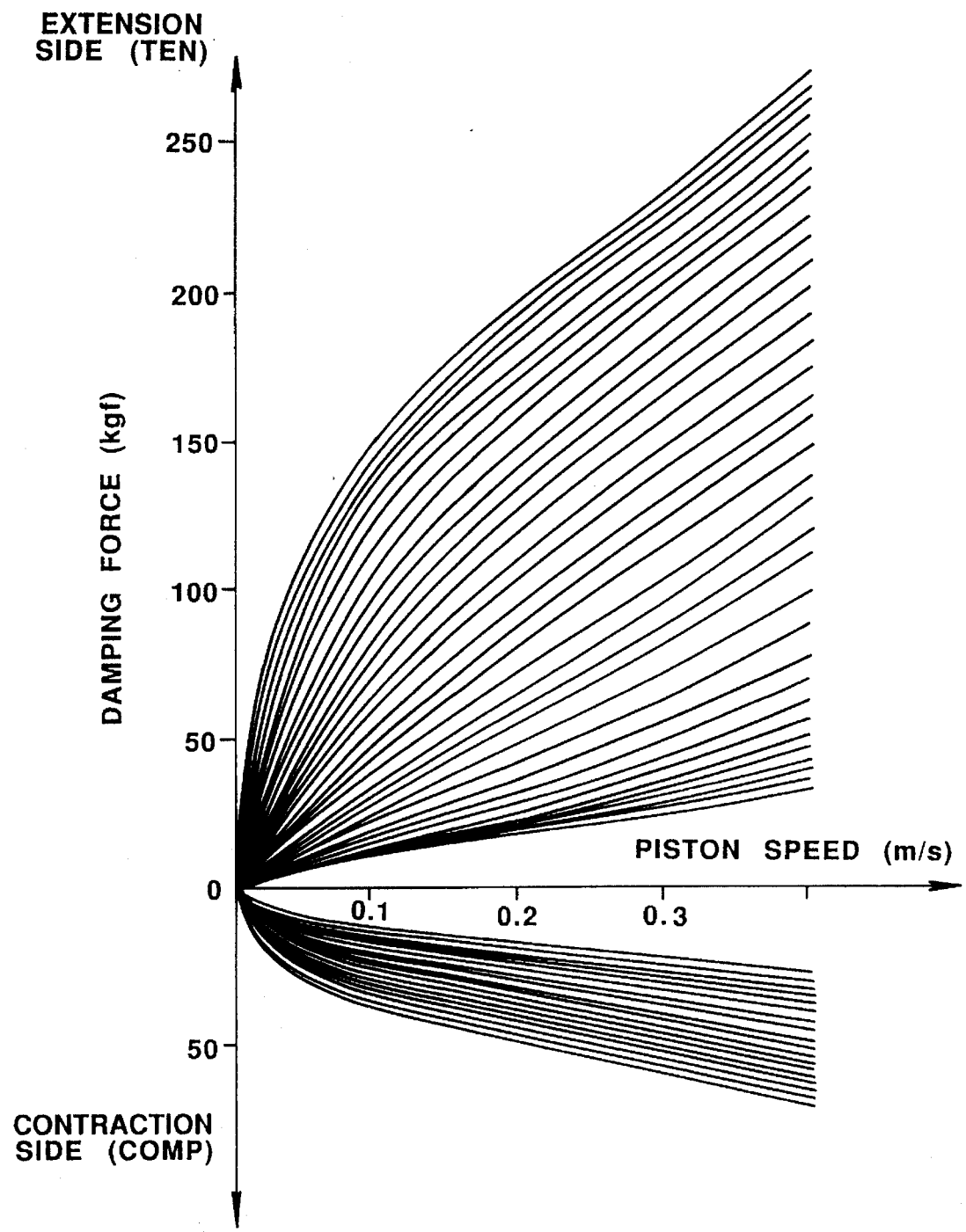
FIG. 5 is a characteristic graph of multiple stages of variably changed damping coefficient with respect to a piston speed of the shock absorber shown in FIG. 4.

That is to say, each shock absorber SA is so constructed that its damping coefficient is variable at the multiple stages from a lowest damping coefficient (hereinafter, referred to as a soft position) to a highest damping coefficient (hereinafter referred to as a hard position) on the basis of the rotational motion of the adjuster 40 rotated by means of the pulse (servo) motor at both extension and contraction sides, as shown in FIG. 5. It is noted that the term contraction can also be called compression (COMP) and the term extension can also be called tension.

In addition, as shown in FIG. 6, when the adjuster 40 is turned (rotated) in a counterclockwise direction as viewed from FIG. 4 with both extension and contraction sides of the damping coefficients placed in the soft positions, the damping coefficient only at the extension side is changed to the hard position. On the contrary, if the adjuster 40 is rotated in the clockwise direction, the damping coefficient only at the contraction side is changed to the hard position.

It is noted that, in FIG. 6, when the adjuster 40 is rotated and halted at the three positions ①, ②, ③, the cross sectional situations of the adjuster 40 cut away along the line K—K along the line M—M and cut away along the line N—N are shown in FIGS. 7 (A), 8 (A), and 9 (A), FIGS. 7 (B), 8 (B), and 9 (B), and FIGS. 7 (C), 8 (C) and 9 (C), respectively.

Figure 10:
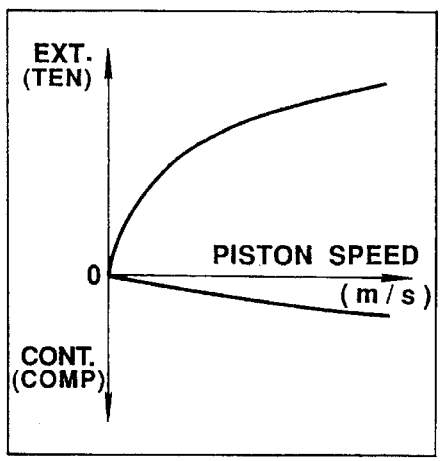
FIGS. 10 through 12 are characteristic graphs of the damping coefficients with respect to the piston speed.
Figure 11:
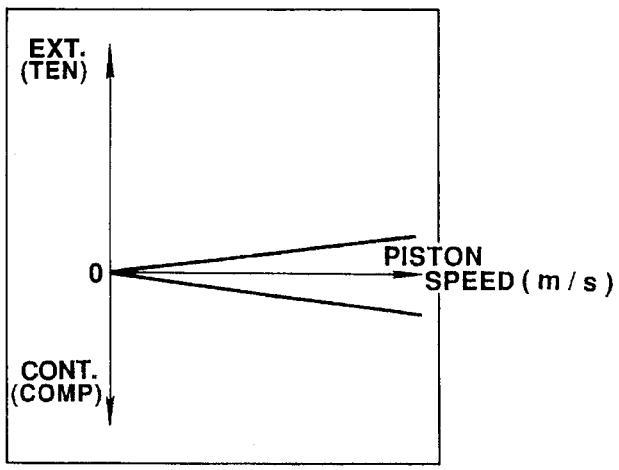
Figure 12:
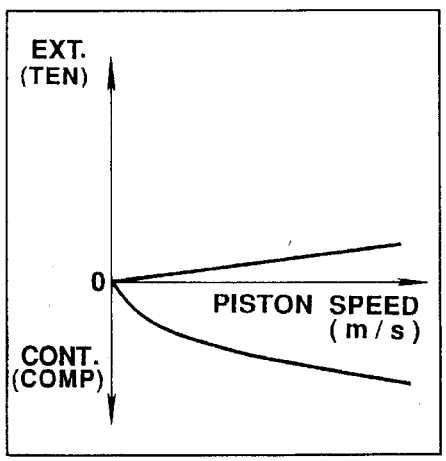

In addition, the damping force characteristic for each position of the adjuster 40 is shown in FIG. 10 (①), FIG. 11 (②) and FIG. 12 (③).

Figure 13:
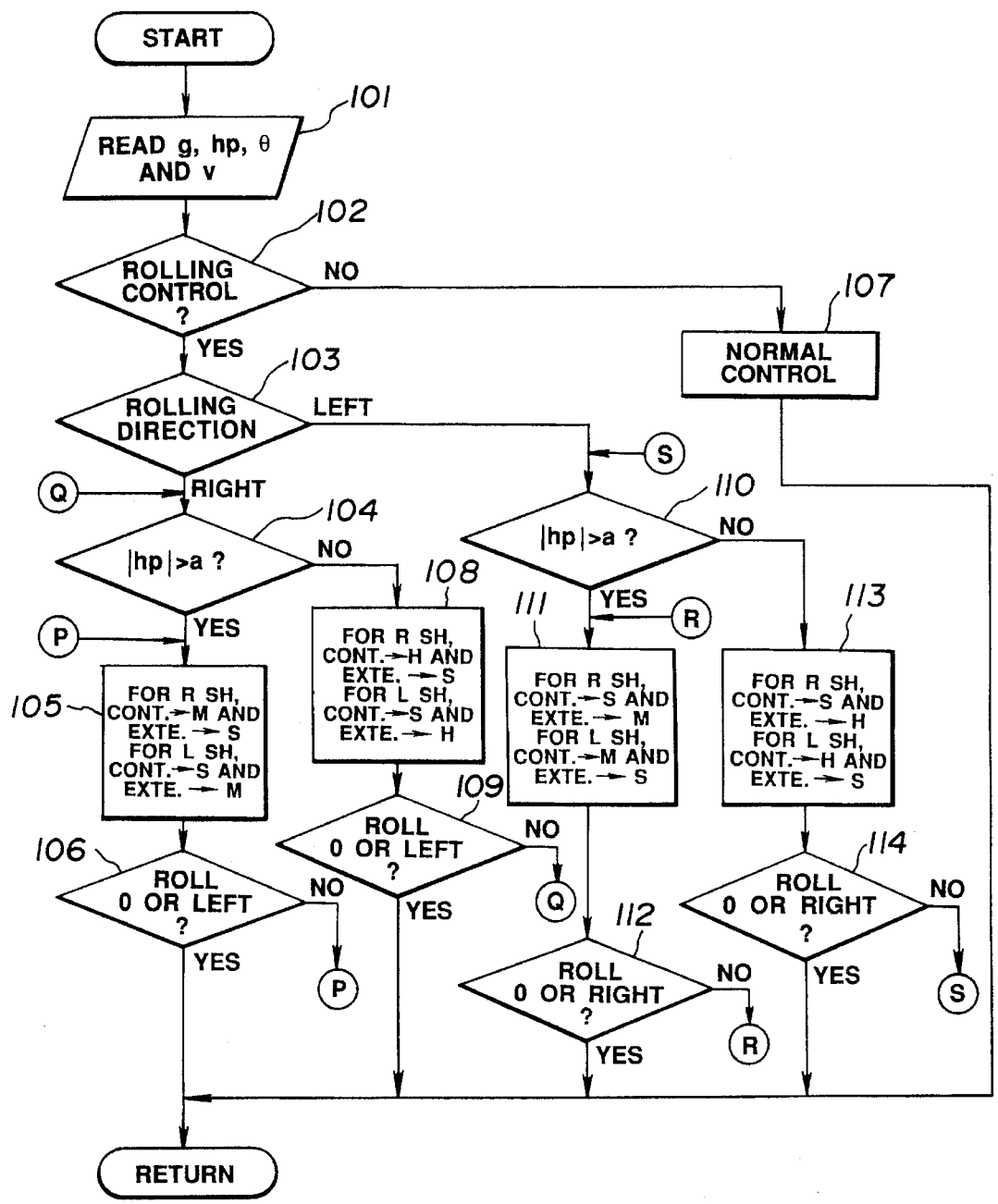
FIG. 13 is an operational flowchart executed by a control unit in the first preferred embodiment.

Next, an operation of the control unit 4 which controls the drives of the pulse motors 3 will be described with reference to a flowchart of FIG. 13.

In a step 101, the CPU 4b reads the vertical acceleration g, the high pass filtered signal $h_p$, steering angle θ, and vehicle speed v from each corresponding sensor shown in FIG. 2.

In a step 102, the CPU 4b determines whether it is a time for a rolling control mode according to the read data read in the step 101.

If YES in the step 102, the routine goes to a step 103. If NO in the step 102, the routine goes to a step 107.

It is noted that the determination of whether it is the time for the rolling control mode is based on the data on the steering angle θ and vehicle speed v. That is to say, when a steering angular displacement speed vθ becomes large and vehicle speed becomes fast, a large rolling motion occurs in the vehicle body, accordingly the determination described above is carried out on the basis of a map defining a rolling control range and non-rolling control range with reference to the steering angular displacement varied speed vθ and vehicle speed v.

In the step 107, the CPU 4b executes a normal damping coefficient control. The normal damping coefficient control is such that the CPU 4b derives the sprung mass (vehicle body) speed on the basis of the input signal from the vertical G sensor 1; when the sprung mass speed indicates substantially or approximately zero, the adjuster 40 is rotated toward the position of ② shown in FIG. 6 so that the damping coefficients at both extension and contraction sides are placed at the soft positions; when the direction of the sprung mass speed is upward, the adjuster 40 is rotated toward the position of ① shown in FIG. 6 according to the magnitude of the sprung mass speed so that the damping coefficient at the extension side is placed at the hard position and that at the contraction side is placed at the soft position; and when the direction of the sprung mass speed is downward, the adjuster 40 is rotated toward the position of ③ shown in FIG. 6 so that the damping coefficient at the extension side is placed at the soft position and that at the contraction side is placed at the hard position.

On the other hand, in the step 103, the CPU 4b determines the direction of rolling. If the direction of the rolling is rightward, the routine goes to a step 104. If the rolling direction is leftward, the routine goes to a step 110. The rolling direction determination is carried out in such a way that the CPU 4b calculates a deviation between the right and left vertical speeds on the basis of the input signals derived from the respective vertical G sensors 1 and the direction of the rolling is determined from the deviation.

In the step 104, the CPU determines whether an absolute value of the high pass filtered signal $h_p$ is larger than a predetermined threshold value k. If YES in the step 104, the routine goes to a step 105. If NO in the step 104, the routine goes to a step 108.

In the step 105, the CPU controls the damping coefficient. In detail, for the right side shock absorbers SA with respect to the vehicle body, the damping coefficient at the contraction side is placed at the medium position and that at the extension side is placed at the soft position. For the left side shock absorbers SA with respect to the vehicle body, the damping coefficient at the extension side is placed at the medium position and that at the contraction side is placed at the soft position. Then, the routine goes to the step 106.

In the step 108, the CPU 4b controls the damping coefficient for each shock absorber SA.

For the right side shock absorbers SA, the damping coefficient at the contraction side is placed at the hard position and that at the extension side is placed at the soft position. For the left side shock absorbers SA, the damping coefficient at the extension side is placed at the hard position and that at the contraction side is placed at the soft position.

Thereafter, the routine goes to a step 109.

In the step 106, the CPU 4b determines whether the rolling is converged to zero or the rolling direction is changed to the left side. If YES (rolling is zero) in the step 106, the routine returns to the start position. If NO in the step 106, the routine returns to the step 105.

In the step 109, the CPU 4b determines whether the rolling is returned to zero or the rolling is changed to the left side. If YES in the step 109, the routine returns to the start position. If NO in the step 109, the routine returns to the step 104.

It is noted that the magnitude and direction of the rolling in the step 106 and in the step 109 are determined on the basis of the input signals derived from the respective vertical G sensors 1.

In the step 110, the CPU 4b determines whether the absolute value of the high pass filtered signal $h_p$ exceeds the predetermined threshold value k.

If YES in the step 110, the routine goes to a step 111. If NO in the step 110, the routine goes to a step 113.

In the step 111, the CPU 4b executes the following damping coefficient control.

For the right side shock absorbers SA, the damping coefficient at the extension side is placed at a medium side and that at the contraction side is placed at the soft position. For the left side shock absorbers SA, the damping coefficient at the contraction side is placed at the medium position and that at the extension side is placed at the soft position. Thereafter, the routine goes to the step 112.

In the step 113, the CPU 4b executes the following damping coefficient control.

For the right shock absorbers SA, the damping coefficient at the extension side is placed at the hard position and that at the contraction side is placed at the soft position. For the left shock absorbers SA, the damping coefficient at the contraction side is placed at the hard position and that at the extension side is placed at the soft position. Thereafter, the routine goes to a step 114.

In the step 112, the CPU 4b determines whether the rolling is converged to zero and the direction of the rolling is changed to the right side. If YES in the step 112, the routine returns to the start position. If NO in the step 112, the routine returns to the step 111.

In the step 114, the CPU 4b similarly determines whether the rolling is zero or the rolling direction is changed to the left. If YES in the step 114, the routine returns to the start position. If NO in the step 114, the routine returns to the step 110.

Next, the operation of the whole suspension control system in the first preferred embodiment will be described with reference to a timing chart shown in FIG. 14.

Figure 14:
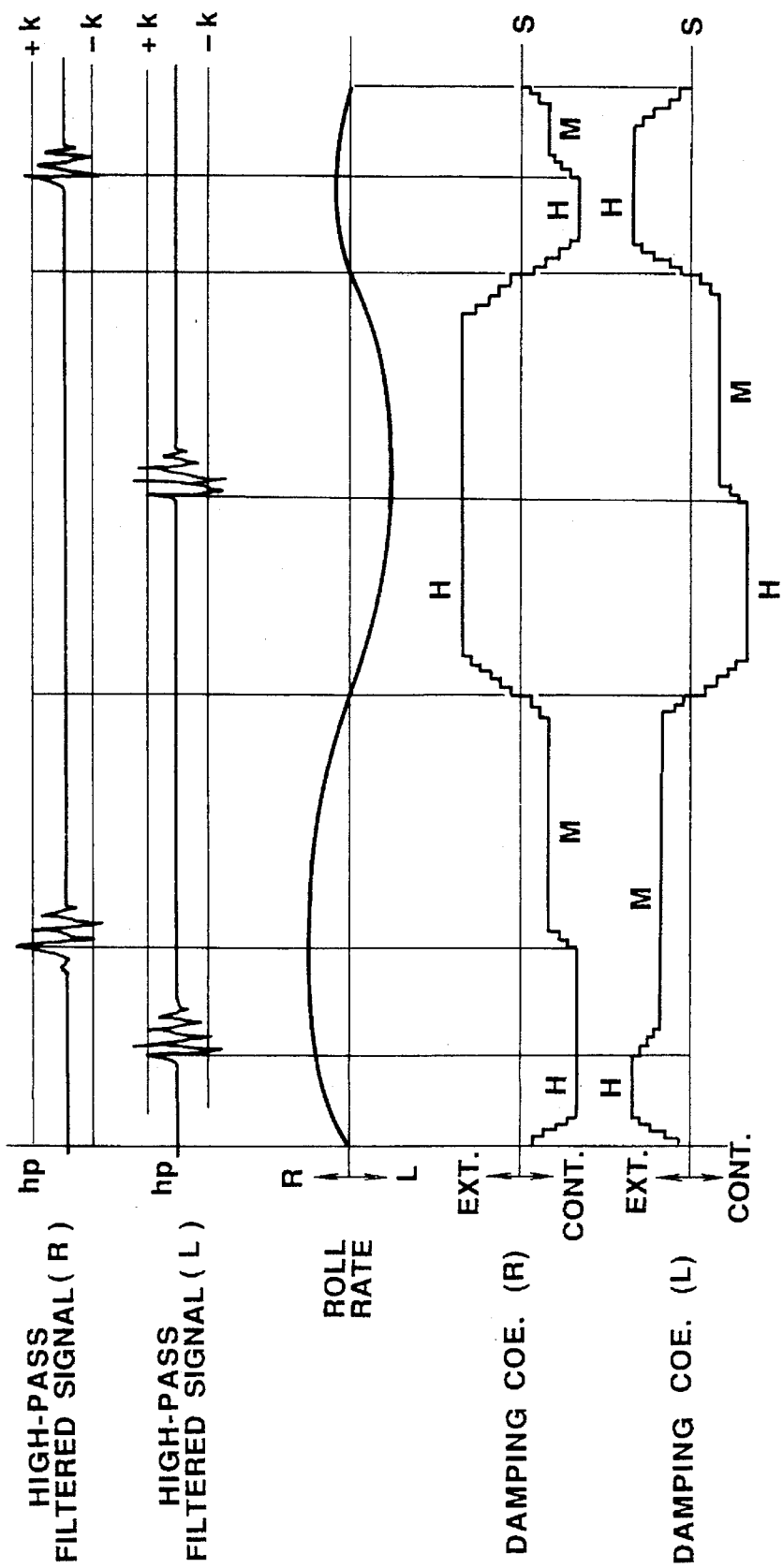
FIG. 14 is a timing chart of the suspension control system in the first preferred embodiment.

In a case where the rolling phenomenon shown by the rolling rate of FIG. 14 occurs on the vehicle body, the CPU 4b executes the rolling control operation so as to suppress the rolling.

That is to say, as shown in FIG. 14, the rightward rolling first occurs. In this case, in the right side shock absorbers SA, the contraction side damping coefficient is placed at the hard position and the extension side coefficient is placed at the soft position. In the left side shock absorbers SA, the extension side damping coefficient is placed at the hard position and the contraction side damping coefficient is placed at the soft position. In this way, the right directional rolling can be suppressed. As described above, in this case, the CPU 4b determines whether it is the time for the CPU 4b to execute the rolling control on the basis of the steering angular displacement θ and vehicle speed v (step 102), the CPU 4b determines the direction of the rolling (step 104) on the basis of the input signals from the respective vertical G sensors 1, and cattles out the rolling control.

When, during the execution of the rolling control, either or any one of the tire wheels runs on a convex-and-recess portion of the running rough road, a vibration component generated due to the passage on the convex-and-recess portion is input to the vehicle body. In this case, the high pass filtered signal $h_p$ exceeds the predetermined threshold values ±k.

In that case, the damping coefficient at either or both sides of the extension or contraction which is placed at the hard position for any of the shock absorbers is reduced to the medium position (steps 104– 105 and steps 110–111: correction control). This causes the transmission rate from the unsprung mass to the sprung mass (vehicle body) to be reduced so that a shock generated due to the convex-and-recess portion of the rough road is not transmitted to the vehicle body and the vehicular comfort can be improved.

As shown in FIG. 14, when the rolling direction is changed from the right direction to the left direction, the CPU 4b again suppresses the rolling. That is to say, for the right shock absorbers SA, the damping coefficient at the extension side is placed at the hard position and that at the contraction side is placed at the soft position. For the left shock absorbers SA, the damping coefficient at the contraction side is placed at the hard position and that at the extension side placed at the soft position.

In addition, at this time, as shown in FIG. 14, when the high pass filtered signal $h_p$ exceeds either of the threshold values ±k, in only the left side shock absorbers SA damping coefficients at the contraction side is reduced to the contraction side medium so that the vehicular comfort can be improved.

As described above, in the first preferred embodiment, when the rolling occurs, the CPU executes the damping coefficient control such that the damping coefficient at one of the stroke sides is placed at the hard position so as to suppress the rolling. However, in a case where a high frequency input occurs from the road surface, the damping coefficient at one of the sides at which the damping coefficient is placed at the hard position is reduced to the medium position. Therefore, the vibration input from the road surface is absorbed and the vehicular comfort can be improved. At this time, one of the shock absorbers in which the damping coefficient needs to be reduced corresponds to only any one of the shock absorbers through which the high frequency vibration input occurs. In addition, since the corresponding damping coefficient is reduced toward the medium position not toward the soft position, the correction control described above can prevent the rolling suppression control from being reduced.

Furthermore, since only the damping coefficient at one stroke direction is placed at the hard position and that at the reverse stroke direction is placed at the soft position during the rolling control, the input of the high frequency components (a range not exceeding the threshold values) of the stroke direction reverse to the one stroke direction is absorbed so that the vehicular comfort can be improved.

Second Preferred Embodiment

Next, the operation of a second preferred embodiment of the suspension control system will be described below. However, the same reference numerals in the second preferred embodiment are the like elements in the first preferred embodiment. Then, described herein are different matters from those described in the first preferred embodiment.

In the second preferred embodiment, each shock absorber SA is of the type in which the damping coefficients at the extension and contraction sides are mutually and similarly varied to each other. Such a type of the shock absorber is exemplified by a Japanese Patent Application First Publication No. Showa 61-163011 (the disclosure of which is herein incorporated by reference).

Figure 15:
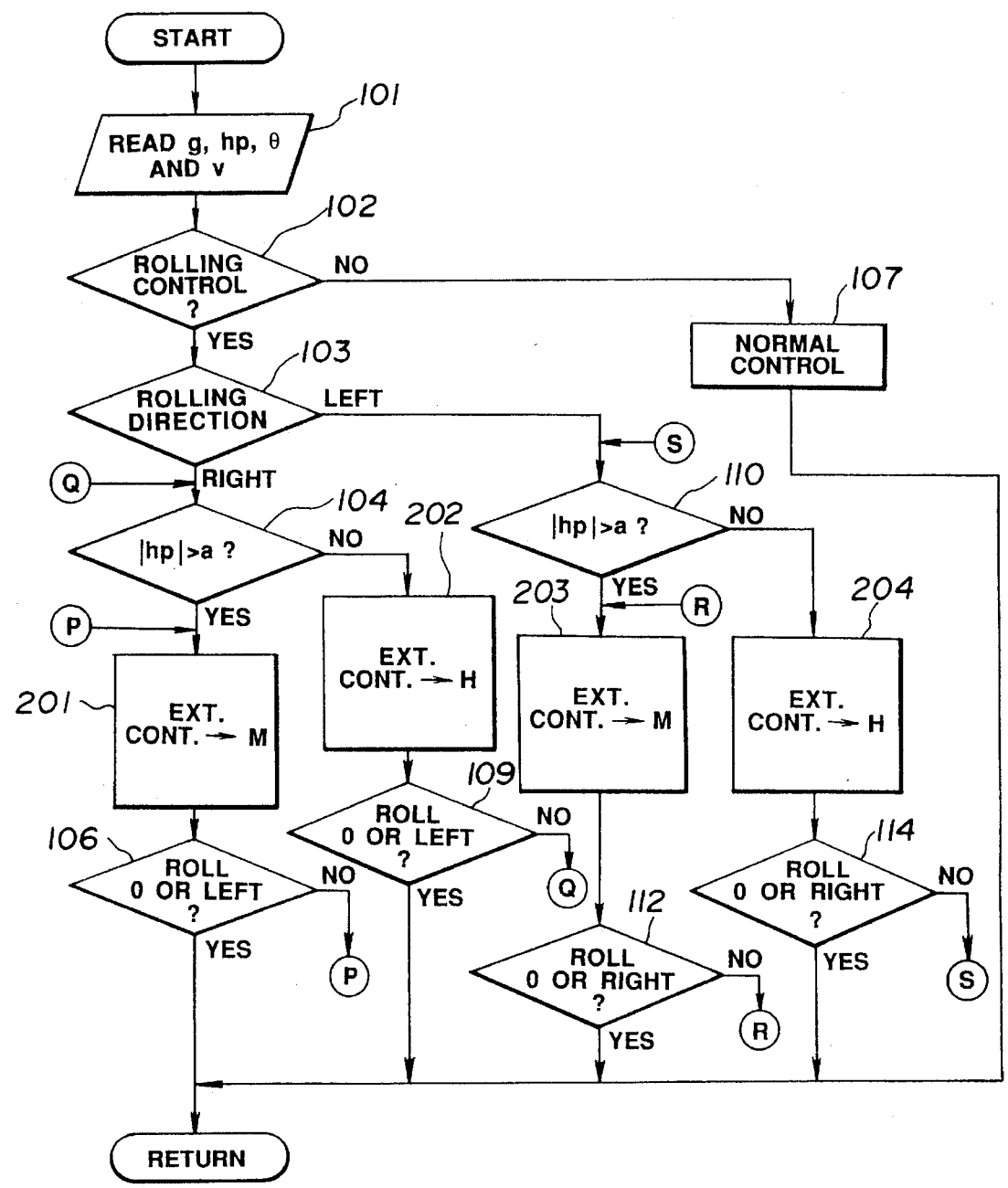
FIG. 15 is an operational flowchart executed by the control unit in a second preferred embodiment.

The operation of the control unit 4 in the second preferred embodiment will be described below with reference to the flowchart of FIG. 15.

In steps 201, 202, 203, and 204 whose contents are different from the steps 105, 108, 111, and 113 in the first preferred embodiment, the respective damping coefficient controls are carried out. Particularly, in the steps 201 and 203, the damping coefficients at both extension and contraction sides are placed at the medium positions, respectively. In the steps 202 and 204, the damping coefficients at both extension and contraction sides are placed at the hard positions, respectively.

Figure 16:
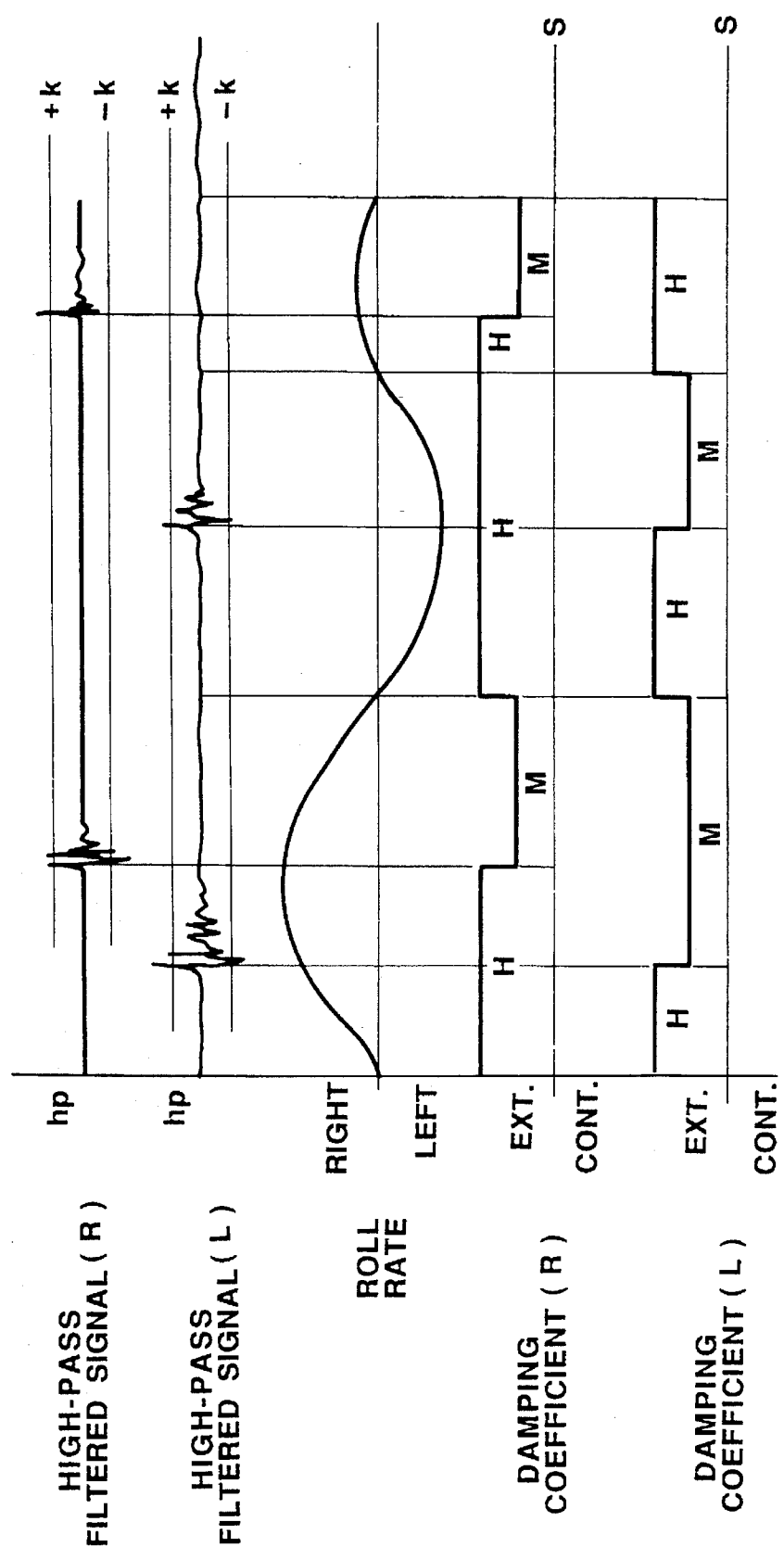
FIG. 16 is a timing chart for explaining the operation of the second preferred embodiment.

Hence, in the case of the second preferred embodiments, as shown in the timing chart of FIG. 16, when the rolling occurs on the right side of the vehicle body, in both left and right shock absorbers SA, the damping coefficient at the extension side is placed at the hard position and that at the contraction side is placed at the hard position so that the rolling is suppressed. In addition, when the high pass filtered signal $h_p$ exceeds the plus and minus threshold values $\pm k$, the damping coefficients at the extension side and at the contraction side are placed at the medium positions so that the input vibration from the road surface can be prevented and vehicular comfort can be improved. On the other hand, when the rolling direction is changed to the left direction, in each of the left and right shock absorbers SA, the damping coefficients at the extension and contraction sides are placed at the hard positions so as to suppress the rolling.

Third Preferred Embodiment

A structure of each shock absorber SA used in a third preferred embodiment will be described below.

The structure of each shock absorber and system configuration of the suspension control system are substantially the same as described in the first preferred embodiment. However, in the third preferred embodiment, the damping coefficients at the extension side and contraction sides can be varied by a total of eleven stages of the damping coefficients as appreciated from FIG. 17.

Figure 17:
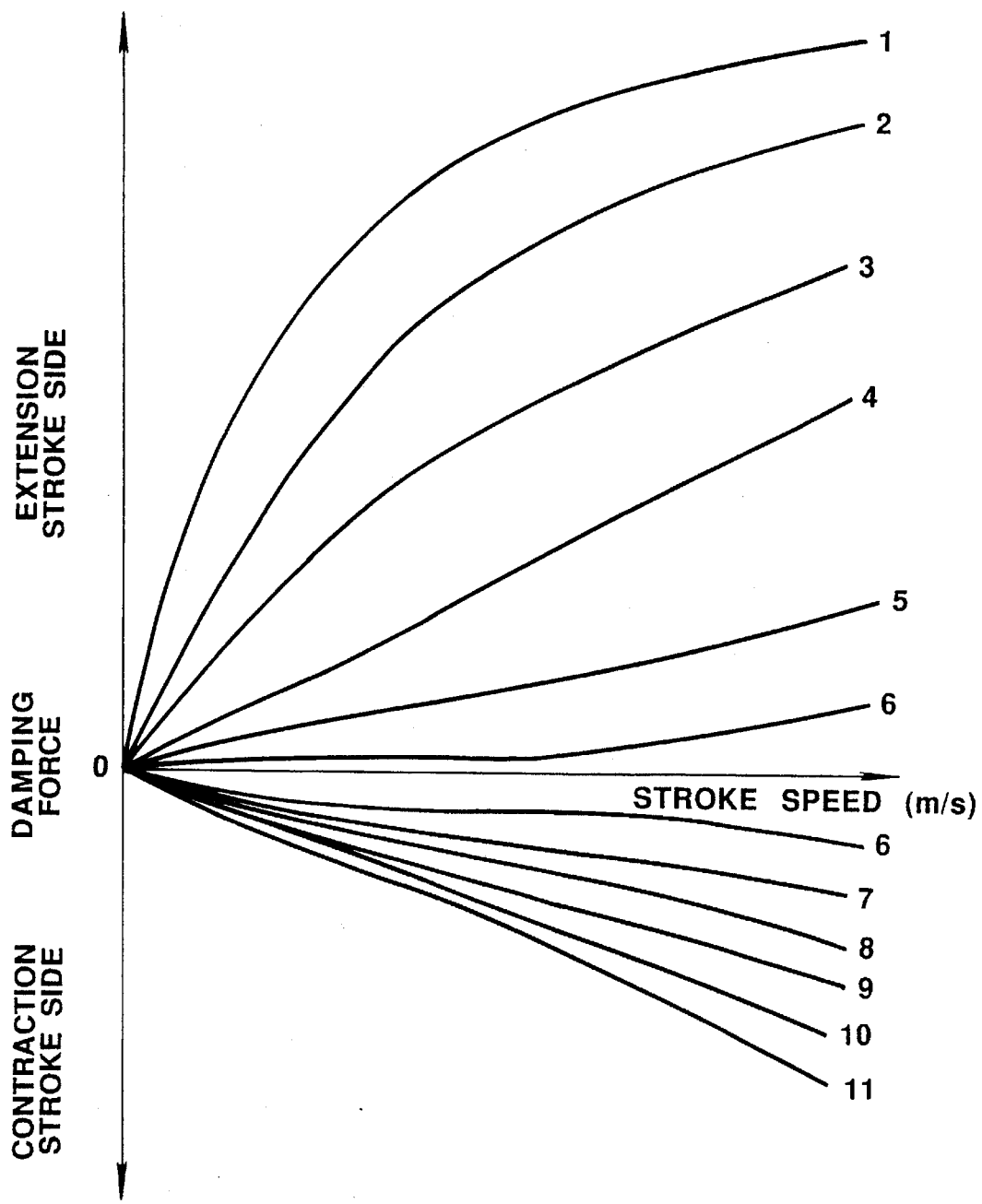
FIG. 17 is a characteristic graph of the variable damping coefficient of the shock absorber used in a third preferred embodiment.

That is to say, FIG. 17 shows damping force characteristics of 11 stages of respective positions with respect to the stroke speed of each shock absorber SA.

In addition, the high pass filter denoted by 4d of FIG. 2 serves to eliminate the sprung mass resonant frequency components of low frequency from the detected sprung mass acceleration signals of the vertical G sensors 1 of FIG. 2. In the third preferred embodiment, the high pass filter having a cut-off frequency of 3 Hz is used and the high pass filter 4d passes the signal having the higher frequency components exceeding 3 Hz, i.e., the signal having the sprung mass frequency components to the control unit 4.

Figure 18:
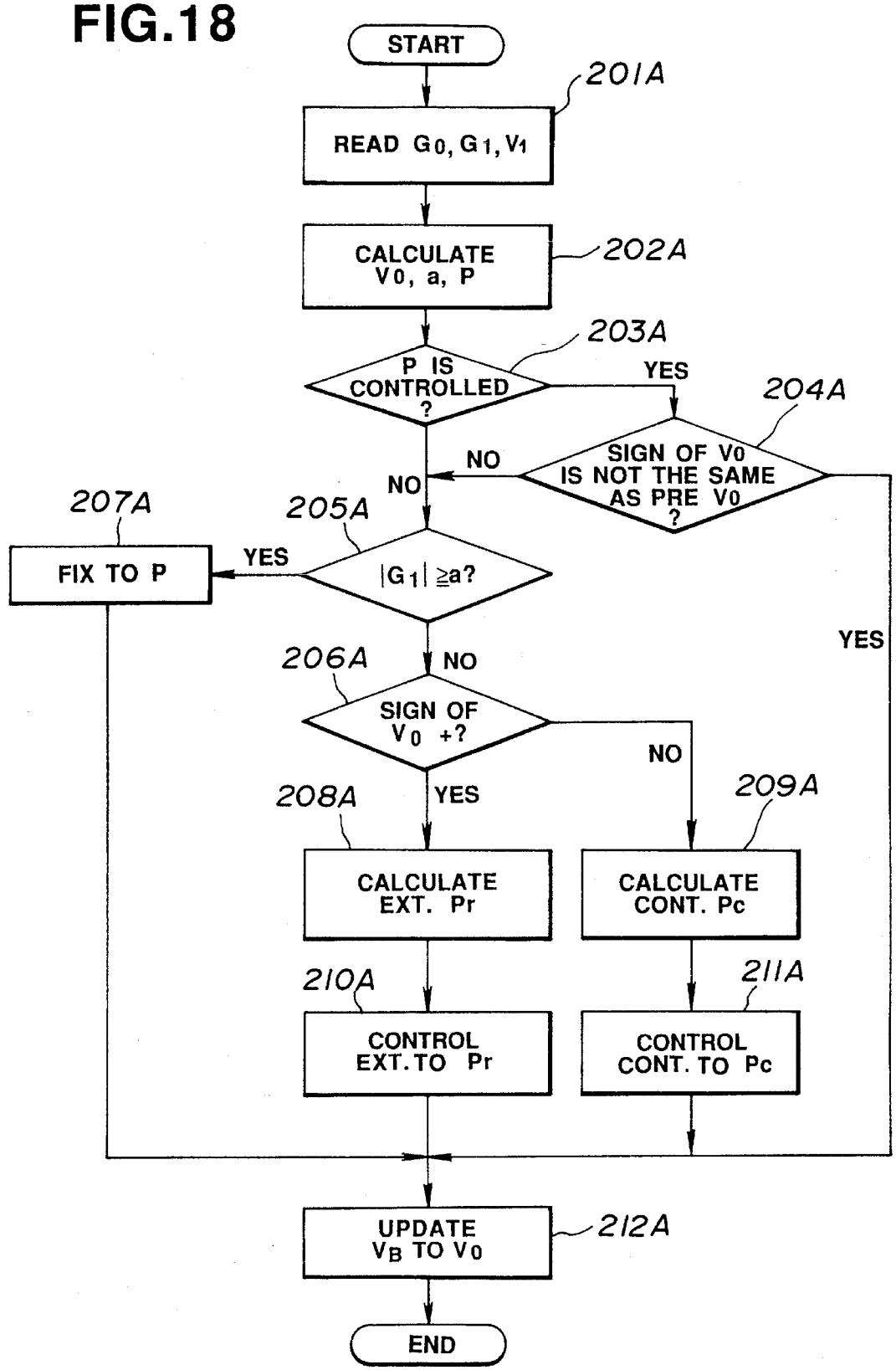
FIG. 18 is an operational flowchart executed by the control unit in the third preferred embodiment.

FIG. 18 shows a control flowchart executed by the control unit 4 in the third preferred embodiment.

in a step 201A, the CPU 4b reads the sprung mass acceleration $G_0$ derived from each of the unsprung mass acceleration sensors (vertical G sensors 1) and acceleration processed signal values $G_1$ from the high pass filter 4d (refer to FIG. 19) and vehicle speed signal $V_1$ from the vehicle speed sensor 5.

Then, in a step 202A, the CPU 4b calculates the sprung mass speed $V_0$ (refer to FIG. 19) from the unsprung mass acceleration $G_0$ and calculates threshold values (a, −a) and predetermined low damping coefficient from the vehicle speed $V_0$.

Figure 20:
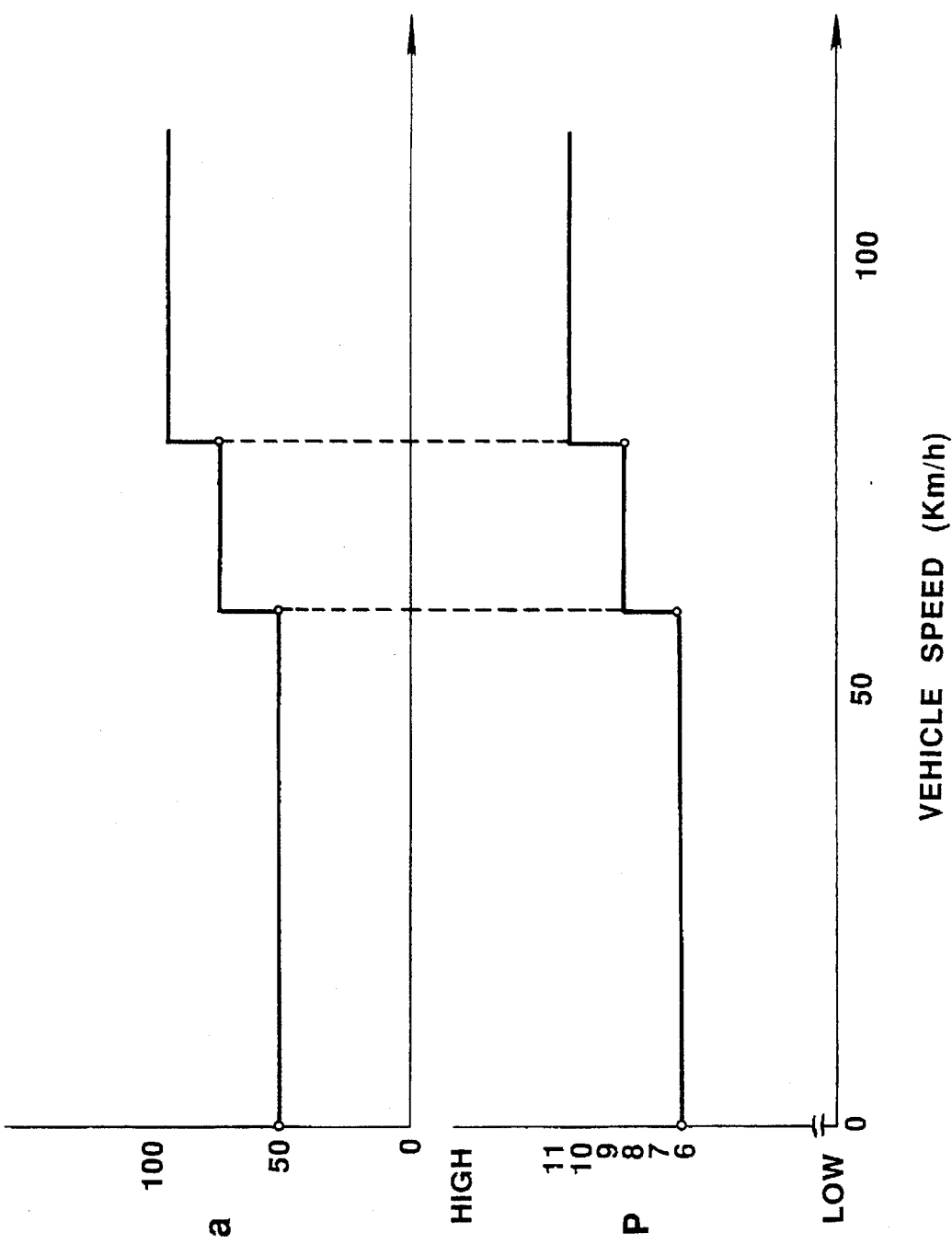
FIGS. 20 (A) and 20 (B) are characteristic graphs of threshold values used in the third preferred embodiment.

That is to say, in the third preferred embodiment, as shown in FIGS. 20 (A) and 20 (B), values of the threshold values (a, −a) and predetermined low damping coefficient P are varied at three stages in proportion to the value of the vehicle speed $V_1$.

in a step 203A, the CPU 4b determines whether the damping coefficient of each shock absorber is under the control to the predetermined low damping coefficient P. If YES in the step 203A, the routine goes to a step 204A. If NO in the step 203A, the routine goes to a step 205A.

In the step 204A, the CPU 4b determines whether the sign of the sprung mass speed $V_0$ (when the direction of the sprung mass speed $V_0$ is upward, + and when the direction of the sprung mass speed $V_0$ is downward, −) indicates a different sign from that of the previous data $V_B$. If YES in the step 204A, the routine goes to a step 205A. If NO in the step 204A, the routine goes to a step 212A in which the previous data $V_B$ of the sprung mass speed is updated to $V_0$ so that once control flow is ended.

In the step 205A, the CPU determines whether the acceleration signal value $G_1$ exceeds the predetermined threshold value a. If YES in the step 205A, the routine goes to a step 207A. If NO in the step 205A, the routine goes to a step 206A.

In the step 207A, the CPU 4b outputs a switching signal to the corresponding actuator (pulse motor 3) so that the damping coefficients at both extension and contraction stroke sides are set to the predetermined low damping coefficients P. Thereafter, the routine goes to a step 210A. The previous data $V_B$ of the sprung mass speed are updated to $V_0$ so that once control flow is ended.

In the step 206A, the CPU 4b determines whether the sign of the unsprung mass speed $V_0$ Is plus (+) (upward of the direction of the sprung mass speed $V_0$). If YES in the step 206A, the routine goes to the step 208A in which the CPU 4b calculates the high damping coefficient $P_T$ at the extension stroke side. In a step 210A, the CPU 4b outputs a switching signal to the pulse motor 3 so that the damping coefficient set at the extension stroke side is changed to the high damping coefficient $P_T$. In addition, if NO in the step 210A, the routine goes to a step 209A in which the CPU 4b calculates the high damping coefficient $P_C$ at the contraction stroke side. In a step 211A, the CPU 4b outputs the switching signal to the pulse motor 3 so that the damping coefficient at the contraction stroke side is changed to the high damping coefficient $P_C$ at the contraction stroke side. Thereafter, the routine goes to a step 212A in which the previous data $V_B$ on the sprung mass speed is updated to $V_0$ and once control flow is ended.

Next, the calculating method of the high damping coefficients $P_T$, $P_C$ will be described below with reference to FIG. 21.

Figure 21:
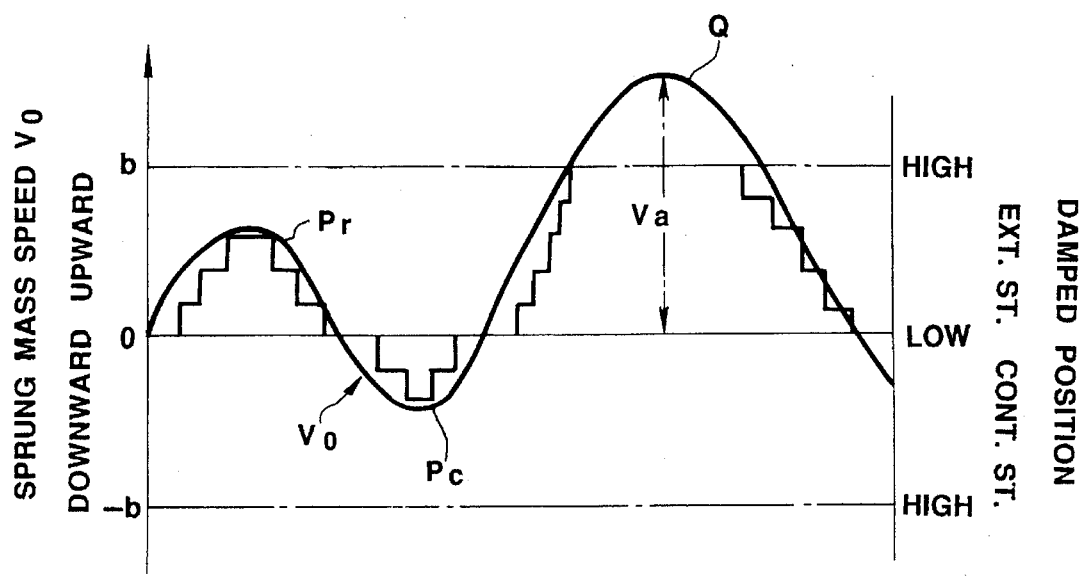
FIG. 21 is a characteristic graph of a sprung mass speed and damping positions used in the third preferred embodiment.

As shown in FIG. 21, proportional regions b—— b are set for the sprung mass speed $V_0$. When the sprung mass speed $V_0$ falls in the proportional region b——b, the proportional region b——b is equally divided by the number of variable stages of the damping coefficient (in this embodiment, as shown in FIG. 17, six stages at each of the extension and contraction stroke sides) controlled through the pulse motor with the proportional stage as a maximum. The damping coefficient is switched stepwise in proportion to the sprung mass speed $V_0$. On the other hand, when the sprung mass speed $V_0$ exceeds the proportional region of b——b, the damping coefficient is fixed to the maximum damping coefficient in terms of the upward direction of the sprung mass speed $V_0$. Thereafter, when the sprung mass speed $V_0$ is directed toward the downward direction from a point of inflection Q, the sprung mass speed $V_0$ at the time of point of inflection Q is equally divided by the number of variable stages of the damping coefficient of the adjuster 40 so that the damping coefficient is stepwise reduced in proportion to the sprung mass speed $V_0$.

Figure 22:
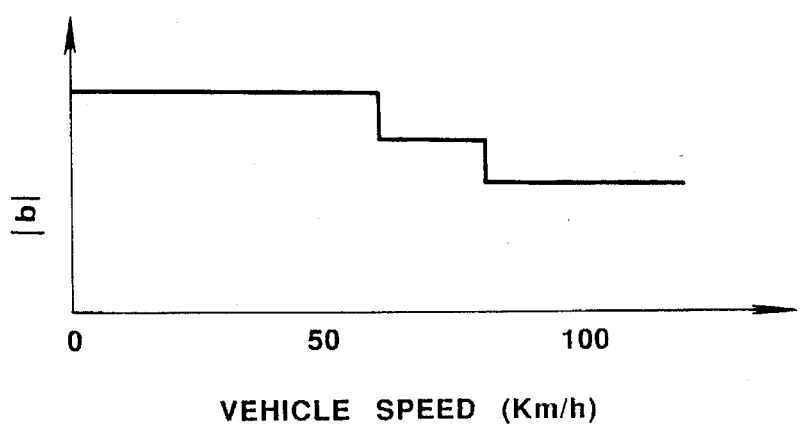
FIG. 22 is a characteristic graph of the threshold value changed according to a vehicle speed used in the third preferred embodiment.

In addition, in the third preferred embodiment, the proportional region b——b is stepwise changed in reverse proportion to the vehicle speed signal $V_1$, as shown in FIG. 22.

Next, the operation of the third preferred embodiment will be described below with reference to FIG. 19.

Figure 19:
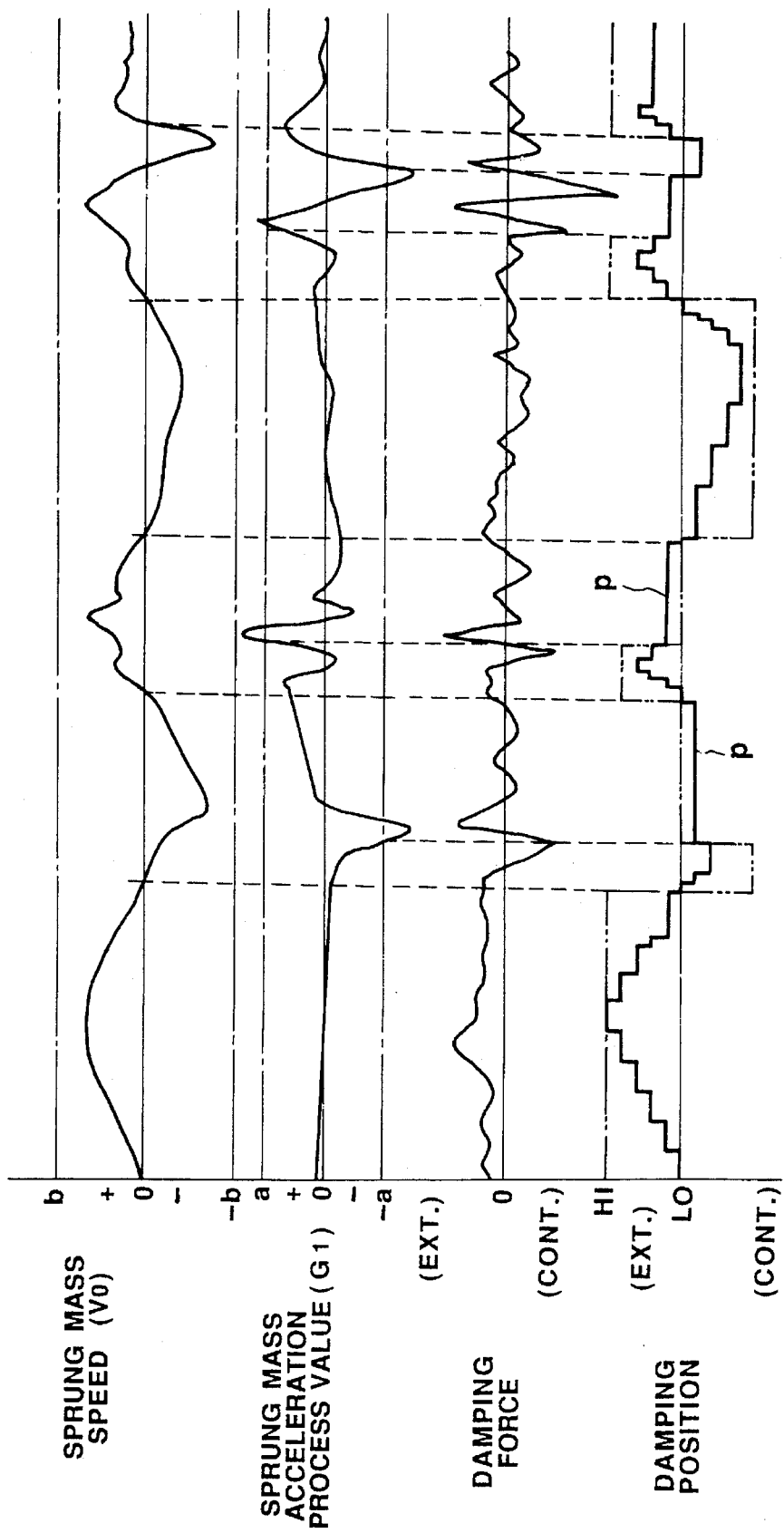
FIG. 19 is a timing chart for explaining an operation of the third preferred embodiment.

FIG. 19 shows a timing chart of the suspension control system in the third preferred embodiment when the vehicle runs.

In FIG. 19, $V_0$ denotes the sprung mass vehicle speed $V_0$, $G_1$ denotes the vertical acceleration value $G_1$, Damping force is shown in the second lowest position of FIG. 19, and a solid line in the lowest position denotes a damping coefficient position.

1) When the acceleration signal value is below a predetermined threshold value:

When the acceleration signal value $G_1$ (unsprung mass frequency component) which is derived from the sprung mass acceleration $G_0$ whose low frequency components including the sprung mass resonant frequency are eliminated falls below the predetermined threshold values ( a——a), the CPU determines that the vibrations on the unsprung mass are not severe (violent).

The switching controls of the damping coefficients are carried out so that one of the stroke sides of the corresponding suspension which is the same direction as that of the sprung mass speed give the high damping coefficient.

That is to say, a) When the direction of the sprung mass speed $V_0$ is upward (+), the damping coefficient is switched to the first position of ① in FIG. 6 such that the high damping coefficient is achieved at the extension stroke side which is the same direction as that of the sprung mass speed $V_0$.

b) when the direction of the sprung mass speed $V_0$ is downward (−), the damping coefficient is switched to the third position (③ in FIG. 6) such that the high damping coefficient at the contraction stroke side which is the same direction as that of the sprung mass speed $V_0$ is achieved and the predetermined low damping coefficient P is achieved at the extension stroke side reverse to the contraction stroke side.

c) At the high damping coefficient side, the stepwise change of the damping position is carried out in proportion to the change in the sprung mass speed $V_0$.

Hence, according to the acceleration signal value $G_1$ from which the sprung mass resonant frequency component is eliminated, the state of the unsprung mass is grasped. When the vibrations on the unsprung mass are not so severe or violent, the high damping coefficient is set at one of the stroke sides of the shock absorber(s) having the same direction as that of the sprung mass speed $V_0$ so that the vibrations on the sprung mass (vehicle body) are suppressed and the steering stability can be improved. With one of the stroke sides having the direction opposite to the direction of the sprung mass speed $V_0$ set to the low damping coefficient P, the road surface input in the reverse direction as the stroke direction during the vibration suppression control is absorbed and the transmission to the vehicle body is prevented so that the vehicular comfort can be improved.

In addition, as described above, the damping position is stepwise changed in proportion to the change in the sprung mass speed $V_0$. Thus, the excessive damping force can be prevented so that the vehicular comfort can, furthermore, be improved.

2) When the acceleration signal value exceeds the predetermined threshold value:

When the acceleration signal value $G_1$ (sprung mass frequency component) is above the predetermined threshold value (a——a), the CPU 4b determines that the vibrations on the unsprung mass are severe (or violent) (up-and-down movements at the unsprung mass are large). In this case, until the direction of the sprung mass speed $V_0$ is reversed (half period of the sprung mass speed waveform), the shock absorber SA is switched to the second position (② in FIG. 6) such that both damping coefficients at the extension and contraction stroke sides are set to the predetermined low damping coefficients P, respectively.

In this way, in the third preferred embodiment, when the large vibrations on the unsprung mass occur, the damping coefficients are controlled toward the predetermined low damping coefficients only during the reverse in the direction of the sprung mass speed $V_0$. The transmission of the sprung mass speed $V_0$ to the vehicular body is prevented and the vehicular comfort can be secured.

In the third preferred embodiment, the CPU 4b determines whether the acceleration signal value $G_1$ exceeds the threshold values ±a so to determine the state of the road surface. An interval of time is not necessary, as compared with a previously proposed method of the comparison between the present data and previous data. Then, the fast responsive characteristic of the control can be enhanced.

Since the value of the threshold value a and the value of the low damping coefficient P are respectively varied in proportion to the vehicle speed signal value $V_1$, the damping coefficient is controlled toward the high damping coefficient side as the vehicle speed becomes high so that the steering stability can be assured.

Fourth Preferred Embodiment

Figure 23:
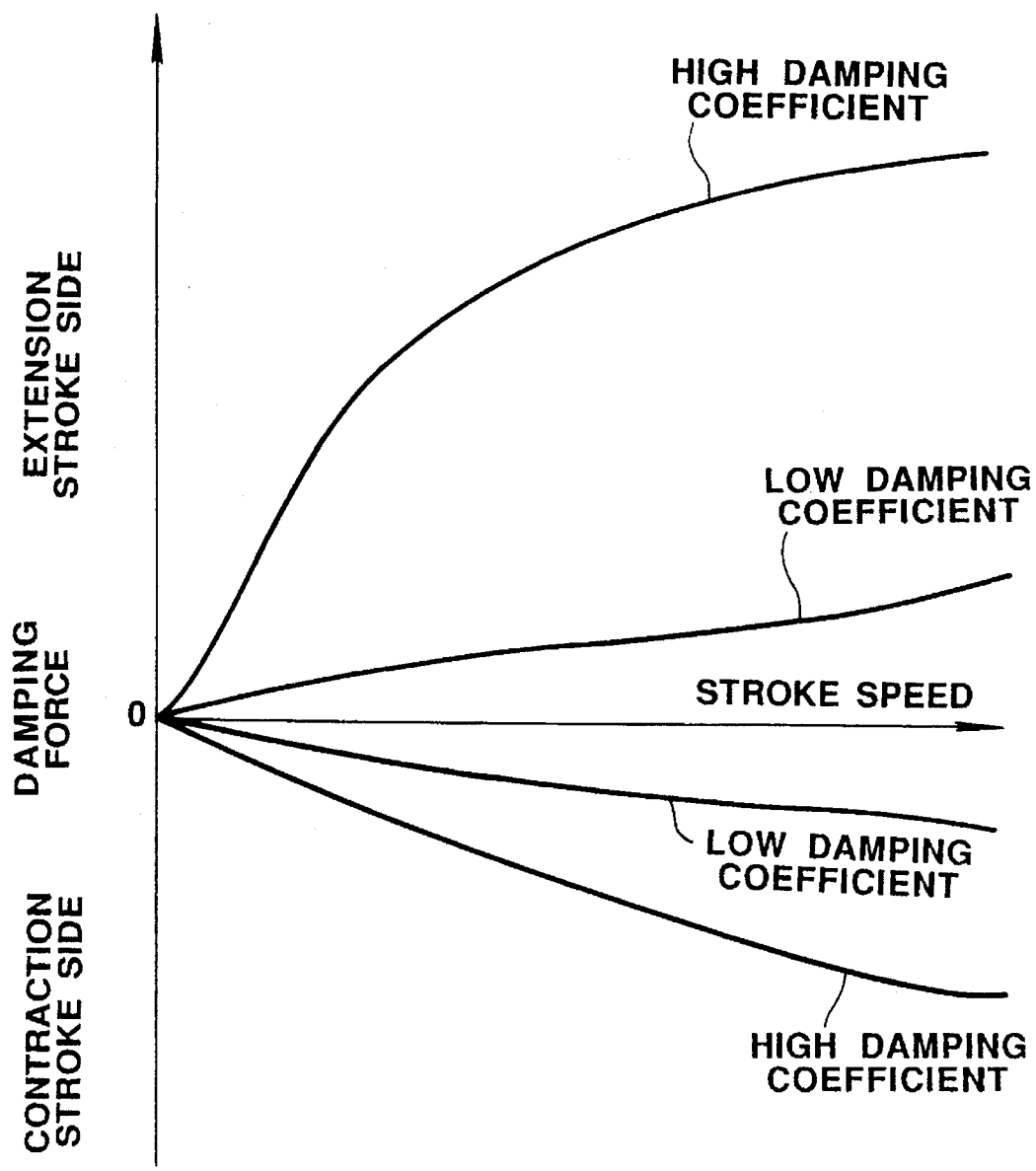
FIG. 23 is a characteristic graph of the varied damping coefficient of the shock absorber used in a fourth preferred embodiment.
Figure 24:
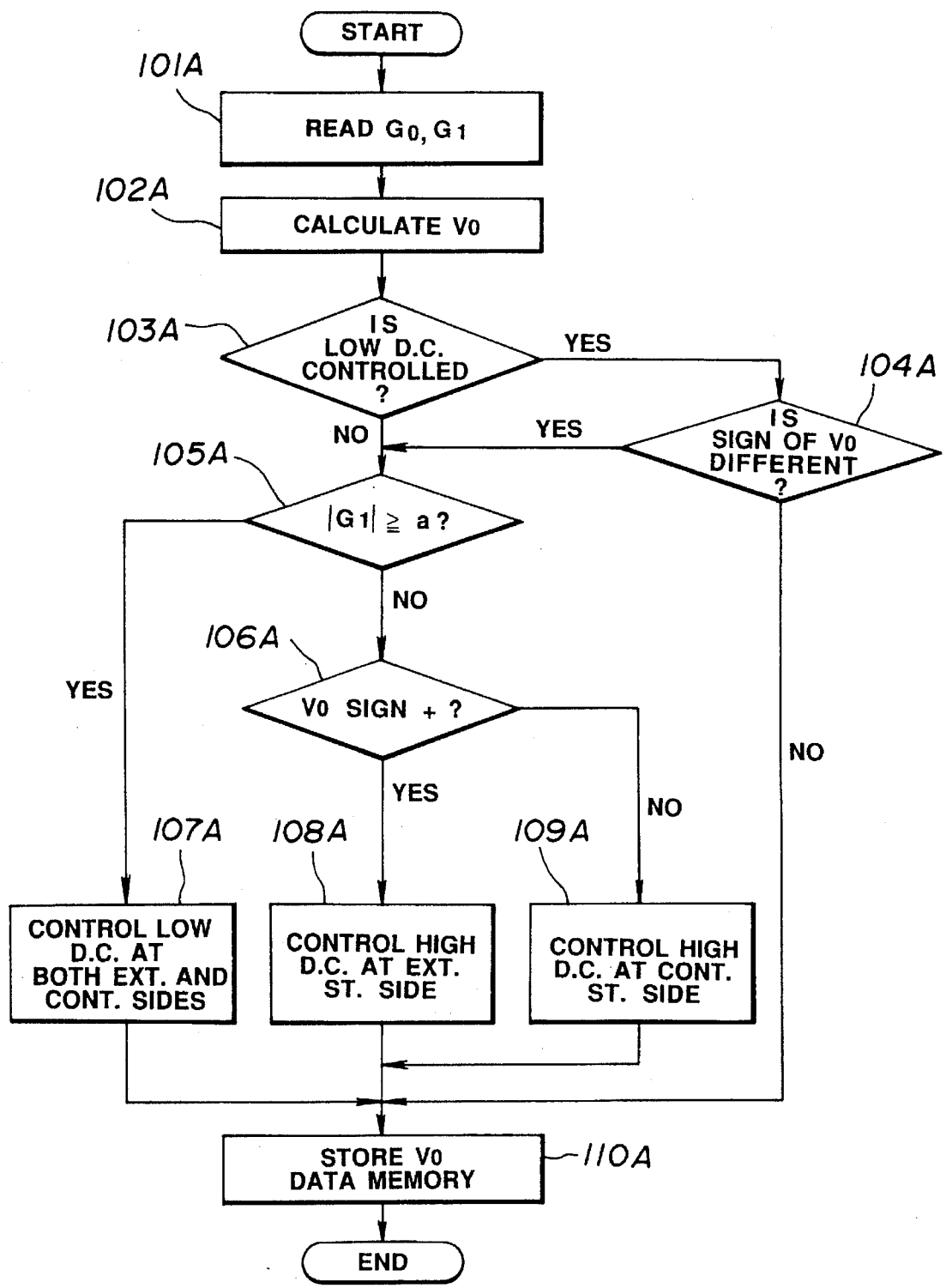
FIG. 24 is an operational flowchart executed by the control unit in the fourth preferred embodiment.

FIGS. 23 and 24 show the damping coefficient characteristic of each shock absorber and operational flowchart executed by the control unit in a fourth preferred embodiment.

The general structure of the suspension system in the fourth preferred embodiment is the same as described in the third preferred embodiment.

However, in the fourth preferred embodiment, the threshold value a by means of the vehicle speed sensor 8 and the control of the low damping position P are omitted from the third preferred embodiment.

The damping coefficient at the high damping coefficient side is only one stage as shown in FIG. 23.

That is to say, in the fourth preferred embodiment, the pulse motor connected to the drive circuit of the control unit is driven totally at three stages of extension and contraction stroke sides. As shown in FIG. 23, each damping coefficient at the extension and contraction stroke sides is varied at two stages, i.e., high damping coefficient and predetermined low damping coefficients, respectively, and, as the total, the damping coefficient can be varied at three stages. That is to say, the high and low damping coefficients at the extension and contraction stroke sides (first stage), the low and low damping coefficients at the extension and contraction stroke sides (second stage), and the low and high damping coefficients at the extension and contraction stroke sides (third stages), as appreciated from FIG. 23.

Next, the operational flow chart executed by the control unit 4 will be described with reference to the flowchart shown in FIG. 24.

In a step 101A, the CPU 4b reads the sprung mass speed $V_0$ from the read sprung mass acceleration sensor 3 and reads the acceleration signal value $G_1$ from the high pass filter 4d. Then, the routine goes to a step 102A.

In the step 102A, the CPU 4b calculates the sprung mass speed $V_0$ and the routine goes to a step 103A.

In a step 103A, the CPU determines whether the control for the shock absorber is carried out so as to give the low damping coefficient P. If YES in the step 103A, the routine goes to a step 104A. If NO in the step 103A, the routine goes to a step 105A.

In the step 104A, the CPU 4b determines whether the sign (the upward direction of the sprung mass speed is + and the downward direction thereof is −) of the sprung mass speed $V_0$ is different from that of the previous data. If YES in the step 104A, the routine goes to a step 105A. If NO in the step 105A, the routine goes to a step 110A in which the data on the unsprung mass speed $V_0$ is stored and once control flow is ended.

In the step 105A, the CPU 4b determines whether the acceleration signal value $G_1$ exceeds the predetermined threshold value a. If YES in the step 105A, the routine goes to a step 107A. If NO in the step 105A, the routine goes to a step 106A.

In the step 107A, the CPU 4b outputs the switching signal to the pulse motor so that the adjuster 40 is rotated at the second position ② in FIG. 6, thus both extension and contraction stroke sides giving the predetermined low damping coefficients. Thereafter, the routine goes to a step 110.

In the step 106A, the CPU 4b determines whether the sign of the sprung mass speed $V_0$ is plus (+) (upward in the direction of the sprung mass speed $V_0$). If YES in the step 106A, the routine goes to a step 108A in which the CPU and drive circuit output the switching signal to the pulse motor so that the adjuster is rotated at the first position of ① in FIG. 6 and, then, the damping coefficient at the extension stroke side provides the high damping coefficient. In addition, if NO in the step 106A, the routine goes to a step 109A in which the CPU 4b and drive circuit output the switching signal to the pulse motor so that the adjuster 40 is rotated at the third position ③ in FIG. 6 and, then, the damping coefficient at the contraction stroke side provides the high damping coefficient. Thereafter, the routine goes to the step 110A.

In the fourth preferred embodiment, the control routine becomes simplified as appreciated from FIG. 24.

Fifth Preferred Embodiment

The general structure of the suspension control system in a fifth preferred embodiment is substantially the same as described in the first preferred embodiment.

Figure 25:
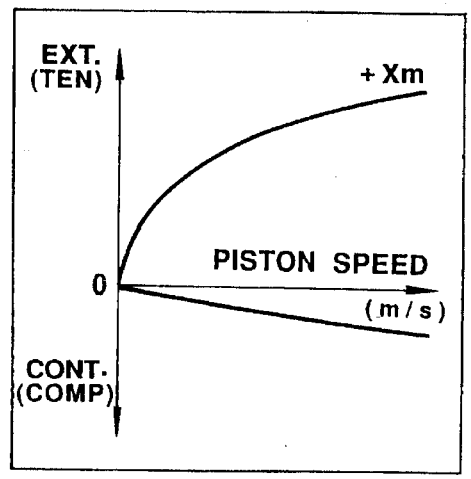
FIG. 25 is a characteristic graph of one stage of the damping coefficient of the shock absorber in the fourth preferred embodiment.

According to each of the three positions of the adjuster 40 in the fifth preferred embodiment, the multiple stages of the damping coefficients can be varied, for example, as shown FIG. 25.

That is to say, at the second position of the adjuster in FIG. 23 (shown by ② in FIG. 26), the extension side first flow passage D, extension stroke side first flow passage H, and contraction side second flow passage J are flowable. Thus, as shown in FIG. 27, the extension stroke side provides the high damping coefficient (+Xm) and the opposite contraction side provides the predetermined low damping coefficient.

Figure 28:
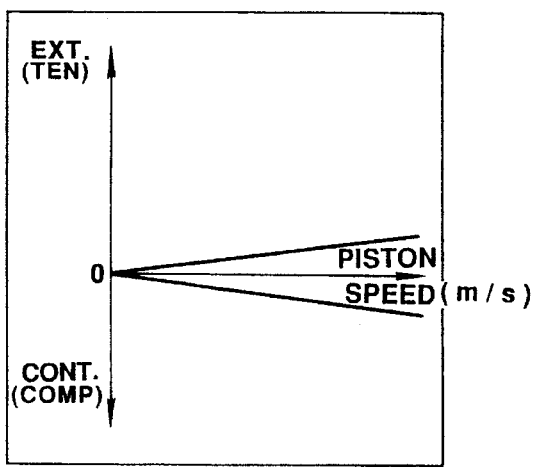

Next, at the first position (① of FIG. 26) of the adjuster 40 as shown in FIG. 8 (A), all four fluid flow passages at the contraction stroke side flow passages D, E, F, and G and three flow passages H, J, and G at the three flow passages H, J, and G are fluid flowable. At this time, as shown in FIG. 28, both extension and contraction stroke sides provide predetermined low damping coefficients.

Figure 29:
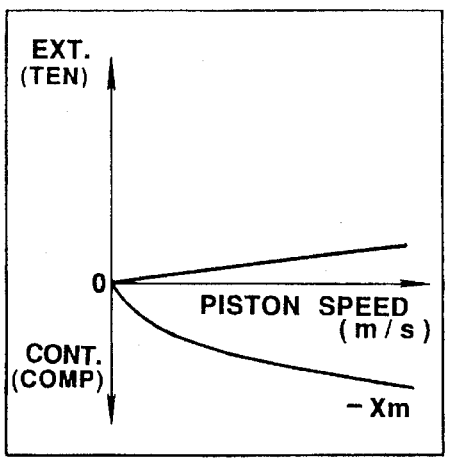

Furthermore, at the third position of FIG. 9 (A) of the adjuster 40 (③ in FIG. 26), the extension stroke side first, second, and third flow passages D, and F and contraction stroke side first flow passage H are flowable. Thus, as shown in FIG. 29, the contraction stroke side provides the high damping coefficient and the extension stroke side provides the predetermined low damping coefficient. Hence, at the first and third position sides of the adjuster described above, the adjuster serves to switch the damping coefficients at the multiple stages according to the stepwise rotation angular displacement of the adjuster and the damping coefficient only at the high damping coefficient side can proportionally be varied.

Figure 30:
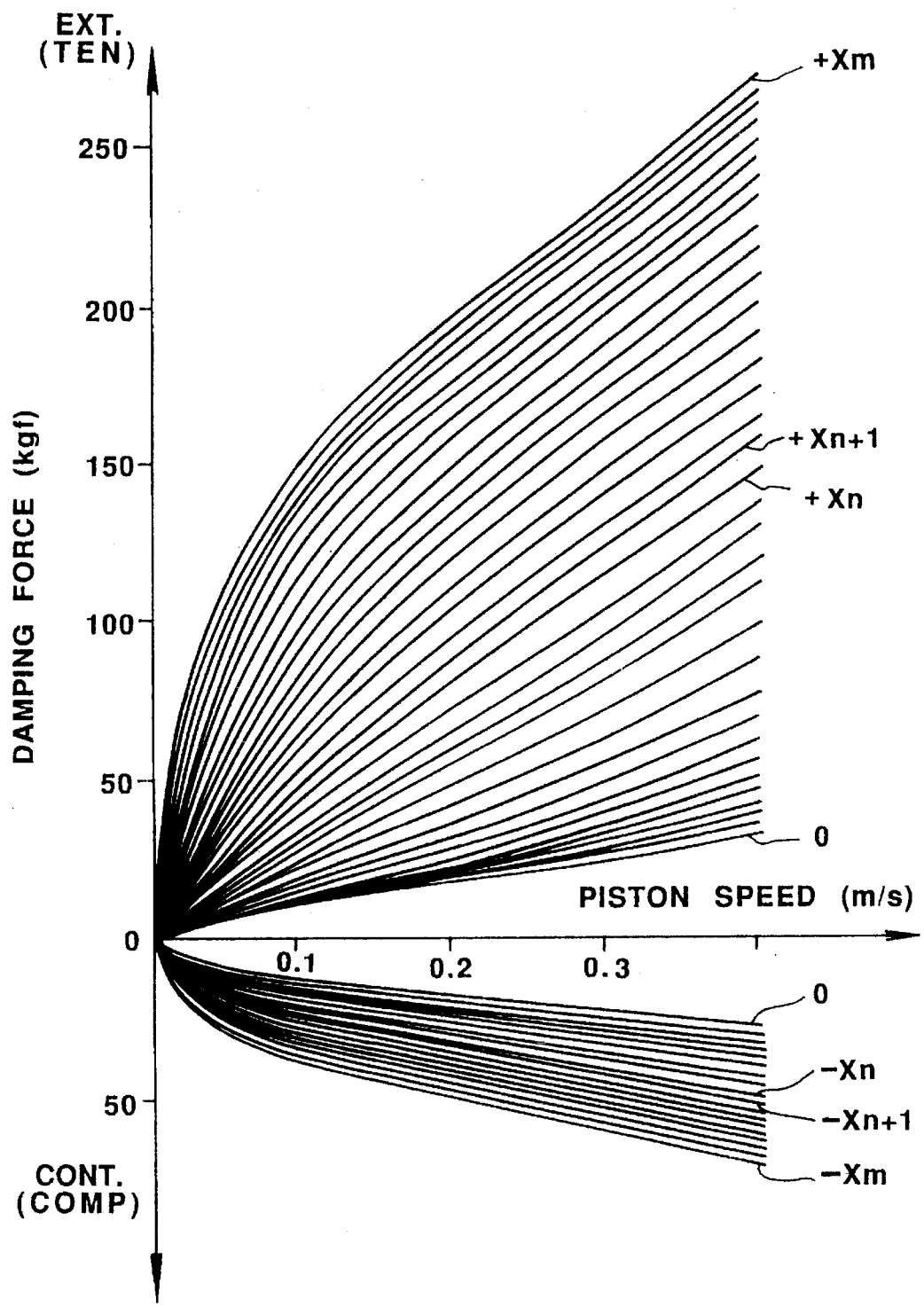
FIG. 30 is a characteristic graph of the variable stages of the damping coefficients used in a fifth preferred embodiment.

That is to say, the shock absorber SA has the multiple stages of variations in the damping coefficient according to the rotation of the adjuster 40 in the way of the characteristic shown in FIG. 30.

Figure 26:
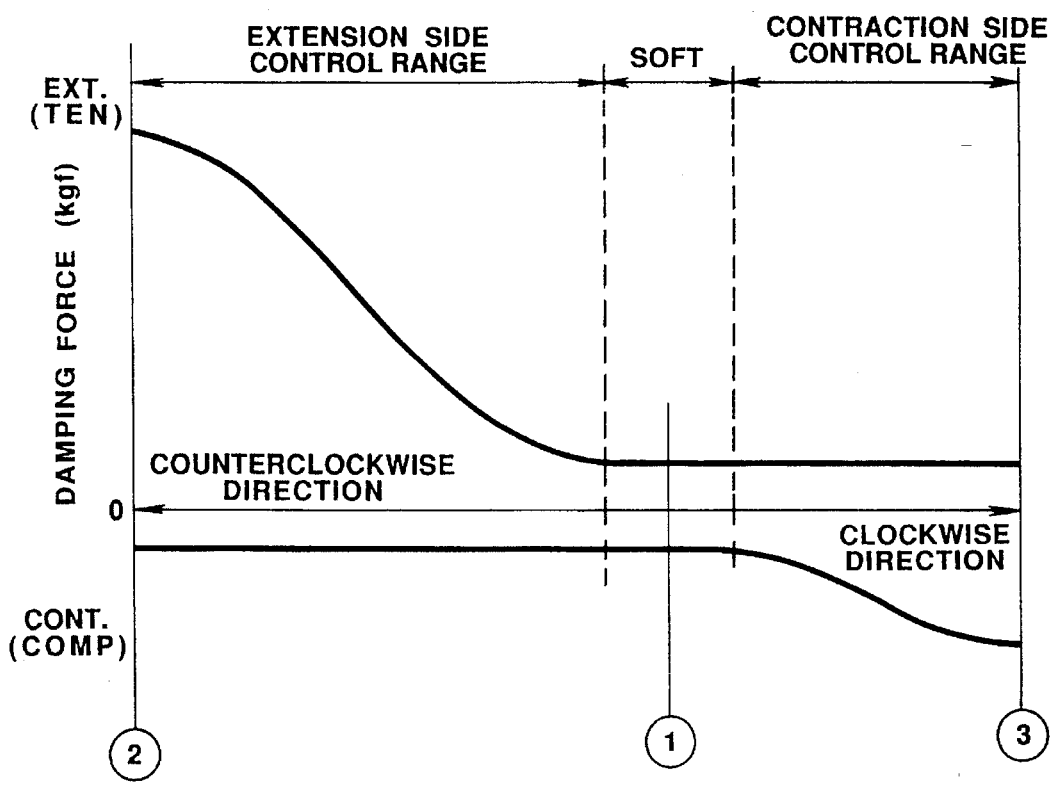
FIG. 26 is a characteristic graph of the damping force with respect to the position of the adjuster 40 used in the fourth preferred embodiment.
Figure 27:
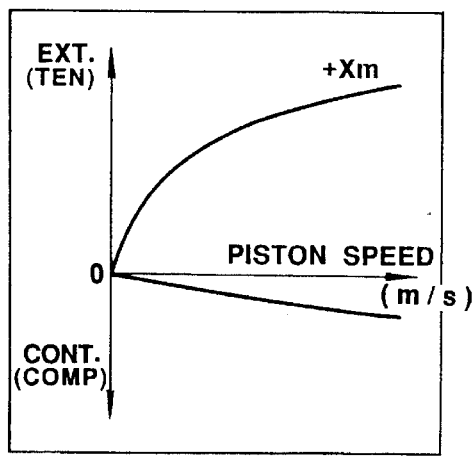
FIGS. 27 through 29 are characteristic graphs of each stage of the damping coefficients used in the fourth preferred embodiment.

When, as shown in FIG. 26, the adjuster 40 is rotated from the position ① at which the damping coefficients at both of the extension and contraction stroke sides provide the low damping coefficients (soft positions) toward the counterclockwise direction, only the damping coefficient at the extension stroke side is changed to the high damping coefficient. On the contrary, when the adjuster is, in turn, rotated toward the clockwise direction, only the damping coefficient at the contraction stroke side is changed to the high damping coefficient.

Next, the operation of the control unit (control circuit) 4 in the fifth preferred embodiment will be described with reference to a flowchart of FIG. 31 and with reference to a timing chart of FIG. 32.

In a step 101B, the CPU 4b determines whether the vibrations on the unsprung mass are large, i.e., the vertical acceleration signal value $G_1$ exceeds a predetermined threshold value denoted by g.

If YES in the seep 101B, the routine goes to a step 103B. If NO in the step 101B, the routine goes to a step 102B.

Figure 31:
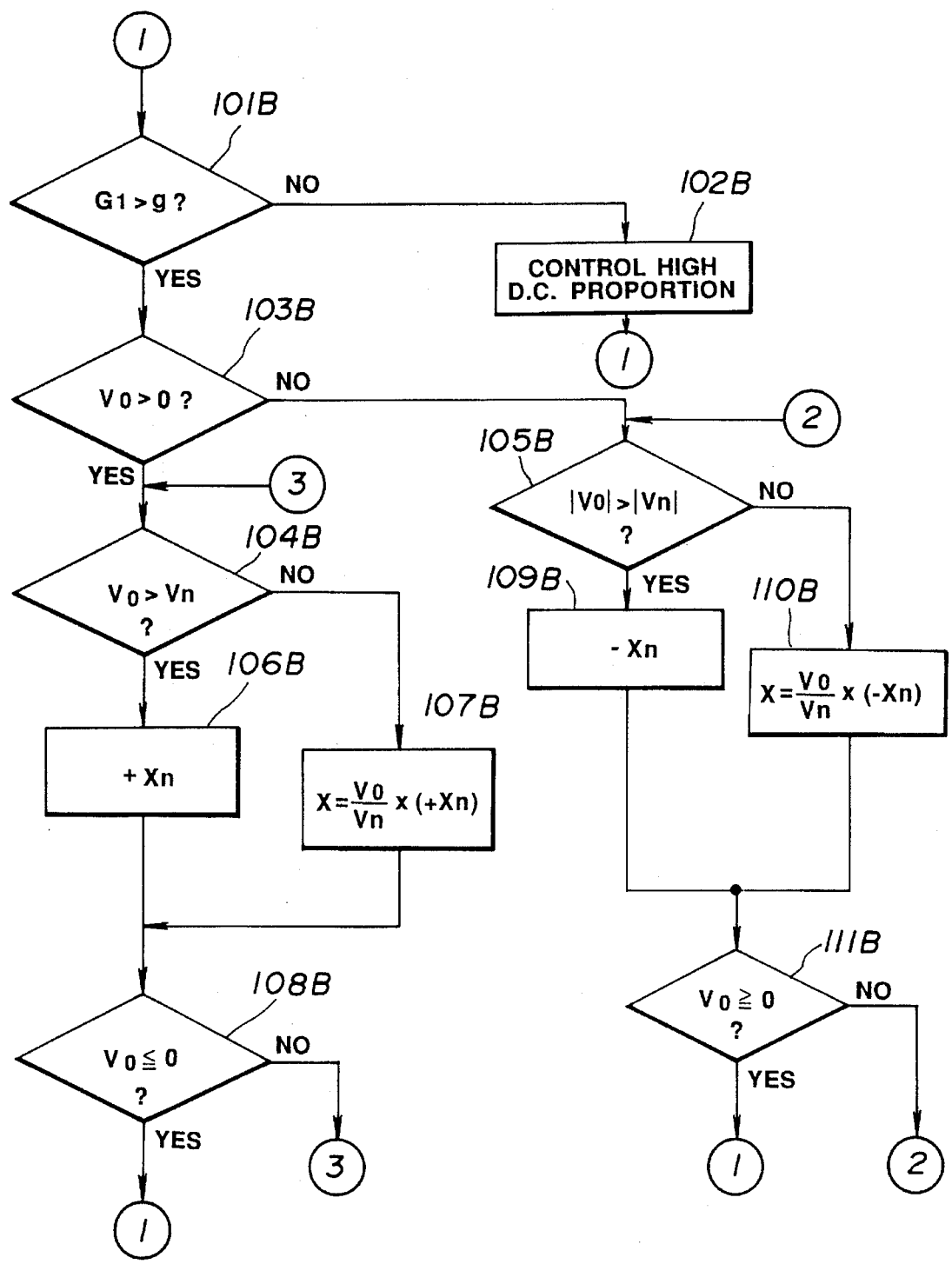
FIG. 31 is an operational flowchart executed by the control unit of the suspension control system in the fifth preferred embodiment.

In the step 102B, the CPU 4b executes a high damping coefficient proportion control such that the damping coefficients in the shock absorber SA are under a proportional control. That is to say, the CPU 4b and drive circuit 4c output the switching signal to the pulse motor 3 so that at one of the stroke sides whose direction of the stroke is the same as that of the sprung mass speed $V_0$ the damping coefficient is changed to the damping coefficient position according to the magnitude of the sprung mass speed $V_0$ $$\{X = V_0/V_n \times (\pm X_m)\}$$

and thereafter once flow of FIG. 31 is ended.

It is noted that at the other stroke whose direction is opposite to the direction of the sprung mass speed $V_0$ is fixed to the predetermined low damping coefficient.

In the step 103B, the CPU 4b determines whether the direction of the sprung mass speed $V_0$ is upward ($V_0>0$). If YES in the step 103B, the routine goes to a step 104B. If NO in the step 103B, the routine goes to a step 105B.

In the step 104B, the CPU 4b determines whether the sprung mass speed $V_0$ exceeds the predetermined threshold value $V_n$. If YES in the step 104B, the routine goes to a step 106B. If NO in the step 104B, the routine goes to a step 107B.

In the step 106B, the CPU 4b executes a low damping coefficient control such that the shock absorber SA is in a predetermined low damping coefficient, i.e., the damping coefficient at the corresponding stroke sides is placed at the predetermined low damping coefficient ($+X_n$ shown in FIG. 30).

In the step 107B, the damping coefficient to be set in the shock absorber SA is proportionally controlled according to the magnitude of the sprung mass speed $V_0$ in a range of the predetermined low damping coefficient ($+ X_n$). That is to say, the CPU 4b and drive circuit 4c output the switching signal to the pulse motor 3 so that the damping coefficient is changed to the predetermined damping coefficient position $$\{X=V_0/V_n \times (+X_n)\}.$$

Thereafter, the routine goes to the step 108B.

In the step 108B, the CPU 4b determines whether the direction of the sprung mass speed $V_0$ is downward ($V_0 \leq 0$). i.e., the direction of the sprung mass speed $V_0$ is reversed. If YES in the step 108B, the once flow of FIG. 31 is ended. If NO in the step 108B, the routine returns to the step 104B so that the low damping coefficient control in the step 106B or the low damping coefficient proportional control in the step 107B is continued until the sprung mass speed $V_0$ exceeds the predetermined threshold value $V_n$ ($V_0 > V_n$).

On the other hand, in the step 105B, the CPU 4b determines whether an absolute value (magnitude) of the sprung mass speed $V_0$ exceeds an absolute value of the predetermined threshold value $$V_n \; (|V_0|>|V_n|).$$

If YES in the step 105B, the routine goes to a step 109B. If NO in the step 105B, the routine goes to a step 110B.

In the step 109B, the CPU 4b executes the control for the shock absorber SA toward the predetermined low damping coefficient in which the damping coefficient is changed to a predetermined low damping coefficient ($-X_n$) and the routine goes to a step 111B.

On the other hand, in the step 110B, the CPU 4b executes the low damping coefficient proportional control in which the damping coefficient in the shock absorber SA is proportionally controlled according to the sprung mass speed $V_0$ in a range of the predetermined low damping coefficient ($-X_n$) so that the damping coefficient therein is changed to the predetermined damping coefficient position $$\{X=V_0/V_n \times (-X_n)\}.$$

Thereafter, the routine goes to the step 111B.

In the step 111B, the CPU 4b determines whether the direction of the sprung mass speed $V_0$ exceeds the upward direction ($V_0 \leq 0$). That is to say, the CPU 4b determines whether the direction of sprung mass speed $V_0$ is reversed. If YES in the step 111B, the once flow is ended. If NO in the step 111B, the routine returns to the step 105B. Then, the step of 109B or the step of 110B is continued until the absolute value of the sprung mass speed $V_0$ exceeds the absolute value of the predetermined threshold value $$(|V_0|>|V_n|).$$

The control unit 4 repeats the above-described routine of FIG. 31.

Next, the operation of the fifth preferred embodiment will be described below with reference to FIG. 32.

Figure 32:
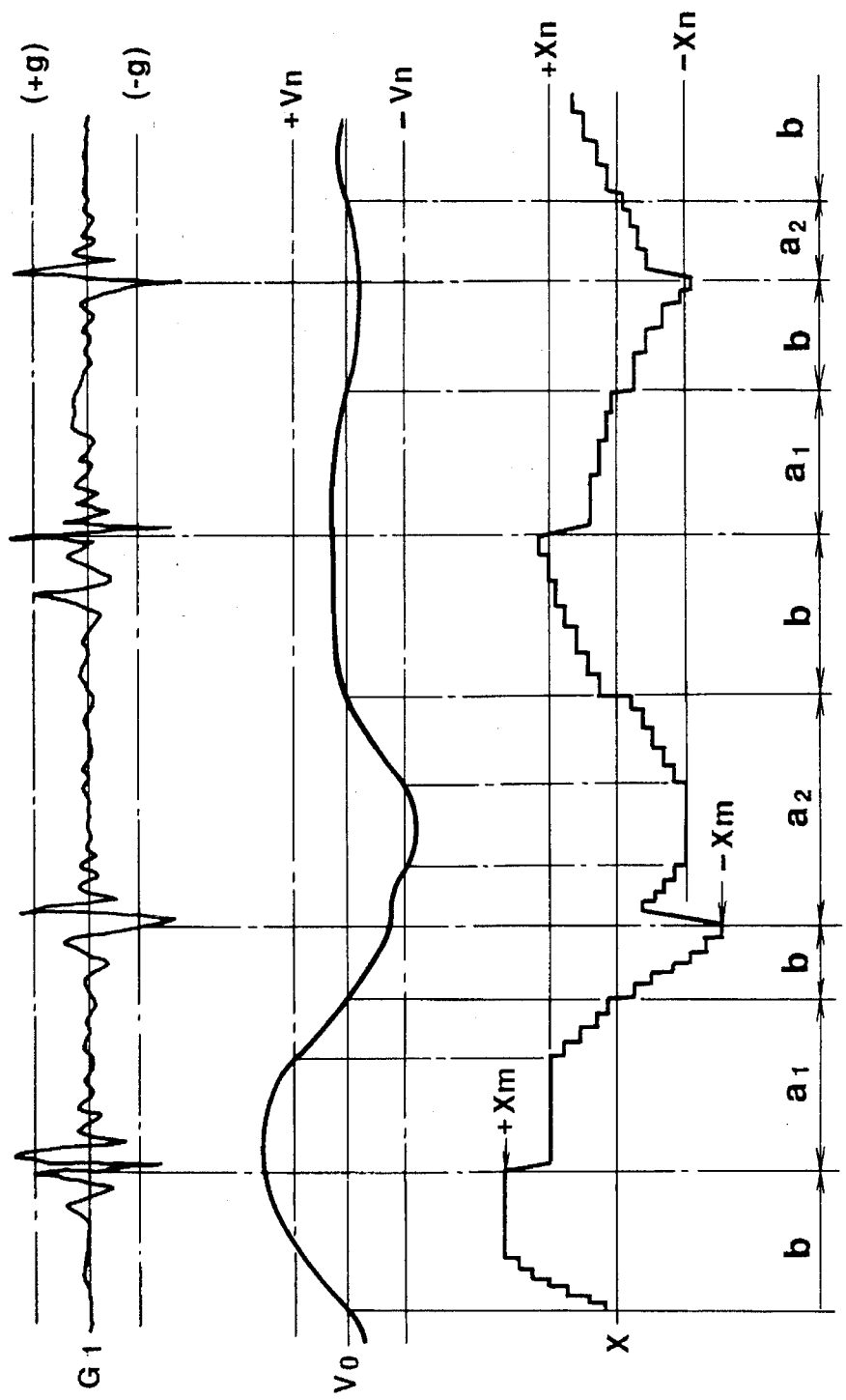
FIG. 32 is a timing chart for explaining the operation of the fifth preferred embodiment.

In the timing chart of FIG. 32, $G_1$ denotes the acceleration signal value $G_1$, $V_0$ denotes the sprung mass speed $V_0$, and X in the lowest position denotes the damping coefficient switching position.

1) When the vibrations on the sprung mass are small.

When the acceleration signal value $G_1$ (frequency component on the unsprung mass) derived from the sprung mass acceleration $G_0$ from which the low frequency components including the sprung mass resonant frequency component are cut off is below either of the predetermined threshold values (+g, −g), the vibrations on the unsprung mass are not so severe or violent (no up-and-down movements under the unsprung mass). Therefore, in this case, the switching control (high damping coefficient proportional control) is carried out such that the damping coefficient at one of the stroke sides whose direction is the same as that of the sprung mass speed $V_0$ provides the high damping coefficient proportional to the sprung mass speed $V_0$.

That is to say;

a) As shown in $a_1$ of FIG. 32, when the acceleration signal value $G_1$ ( frequency component on the is unsprung mass) is below either of the predetermined value (+g, −g) and the direction of the sprung mass speed $V_0$ is upward (+), the position of the adjuster 40 is switched to the second position (② in FIG. 26 and the position shown in FIG. 27) so that the damping coefficient at the extension stroke side whose direction is the same as that of the sprung mass speed $V_0$ is the same as that of the sprung mass speed $V_0$ $$\{X=V_0/V_n \times X_m)\}$$

and the damping coefficient at the contraction stroke side provides the predetermined low damping coefficient.

b) As shown in $a_2$ of FIG. 32, when the acceleration signal value $G_1$ (frequency component on the unsprung mass) is below either of the predetermined threshold values (+g, −g) and the direction of the sprung mass speed is downward (−), the position of the adjuster is placed at the third position (③ in FIG. 26 and the position shown in FIG. 29) the damping force at the contraction stroke side whose direction is the same as that of the sprung mass speed $V_0$ provides the high damping coefficient position in proportion to the sprung mass speed $V_0$ $$\{X=V_0/V_n \times (-X_m)\}$$

and the damping coefficient at the extension stroke side provides the predetermined low damping coefficient.

Hence, the state below the unsprung mass can accurately be grasped according to the acceleration value $G_1$ from which the sprung mass resonant frequency component is eliminated. When the vibrations on the sprung mass (vehicle body) are not so large, the damping coefficient at one of the stroke sides whose direction is the same as that of the sprung mass speed $V_0$ provides the high damping coefficient position in proportion to the sprung mass speed $V_0$. Thus, the vibrations on the sprung mass (vehicle body) are suppressed and the steering stability can be improved. In addition, the damping coefficient at the other stroke side whose direction is opposite to the direction of the sprung mass speed $V_0$ provides the predetermined low damping coefficient so that the input of road surface whose direction is opposite to the stroke side during the vibration suppression control is absorbed, the transmission toward the vehicle body is prevented and vehicular comfort can be improved.

On the other hand, since the control in proportion to the sprung mass speed is carried out so that the change in damping coefficient immediately after the switch in the stroke of the shock absorber can become smooth.

2) When the vibrations on the sprung mass are severe:

When the acceleration signal value $G_1$ (unsprung mass frequency component) is below the predetermined threshold value range ($\pm g$), the vibrations below the unsprung mass are severe. In this case, while the sprung mass speed direction is reversed (half period of the sprung mass speed waveform), the damping coefficient at the stroke side of the shock absorber SA whose direction is the same as that of the sprung mass speed is controlled in the following way:

a) While the sprung mass speed $V_O$ exceeds the predetermined threshold values ($+V_n$, $-V_n$), the damping coefficients are controlled to the predetermined damping coefficients ($+X_n$, $-X_n$).

In details, in a case where the vibrations below the unsprung mass are severe (or violent), the damping coefficients are limited to the predetermined low damping coefficients ($+X_n$, $-X_n$) so that the vibrations below the unsprung mass are absorbed and the transmission toward the sprung mass is suppressed. Thus, the vehicular comfort can be assured. In addition, the follow-up of the unsprung mass to the variations in the road surface can be facilitated and grounding stability of the vehicular tire wheels can be improved.

b) When the sprung mass speed is less than either of the predetermined threshold values ($+V_n$, $-V_n$), the damping coefficients are controlled such as to provide the damping coefficient positions $$\{X=V_O/V_n \times (\pm V_n)\}$$

in proportion to the sprung mass speed in a range of the predetermined low damping coefficients ($+X_n$, $-X_n$) as its maximum limit.

Therefore, the change in the damping coefficients immediately before the change in the stroke side of the shock absorber SA.

In the fifth preferred embodiment, the abrupt change in the damping coefficients at the time of change in the stroke direction of the shock absorber SA can be prevented and the vehicular comfort can be improved.

Although, in the fifth preferred embodiment, the proportional control uses the following equations $$\{X=V_O/V_n \times (\pm X_m)\}$$

and $$\{X=(V_O/V_n) \times (\pm X_n)\},$$

the following equations may be substituted:

$$\{X=(V_O/V_n)^N \times (\pm X_m)\}$$

and $$\{X=(V_O/V_n)^N \times (\pm X_n)\}.$$

It is noted that $(\ )^N$ denotes a real number larger than 0.

In addition, the threshold values $V_n$, $X_n$ may be varied according to the direction of the sprung mass speed.

Sixth Preferred Embodiment

Figure 33:
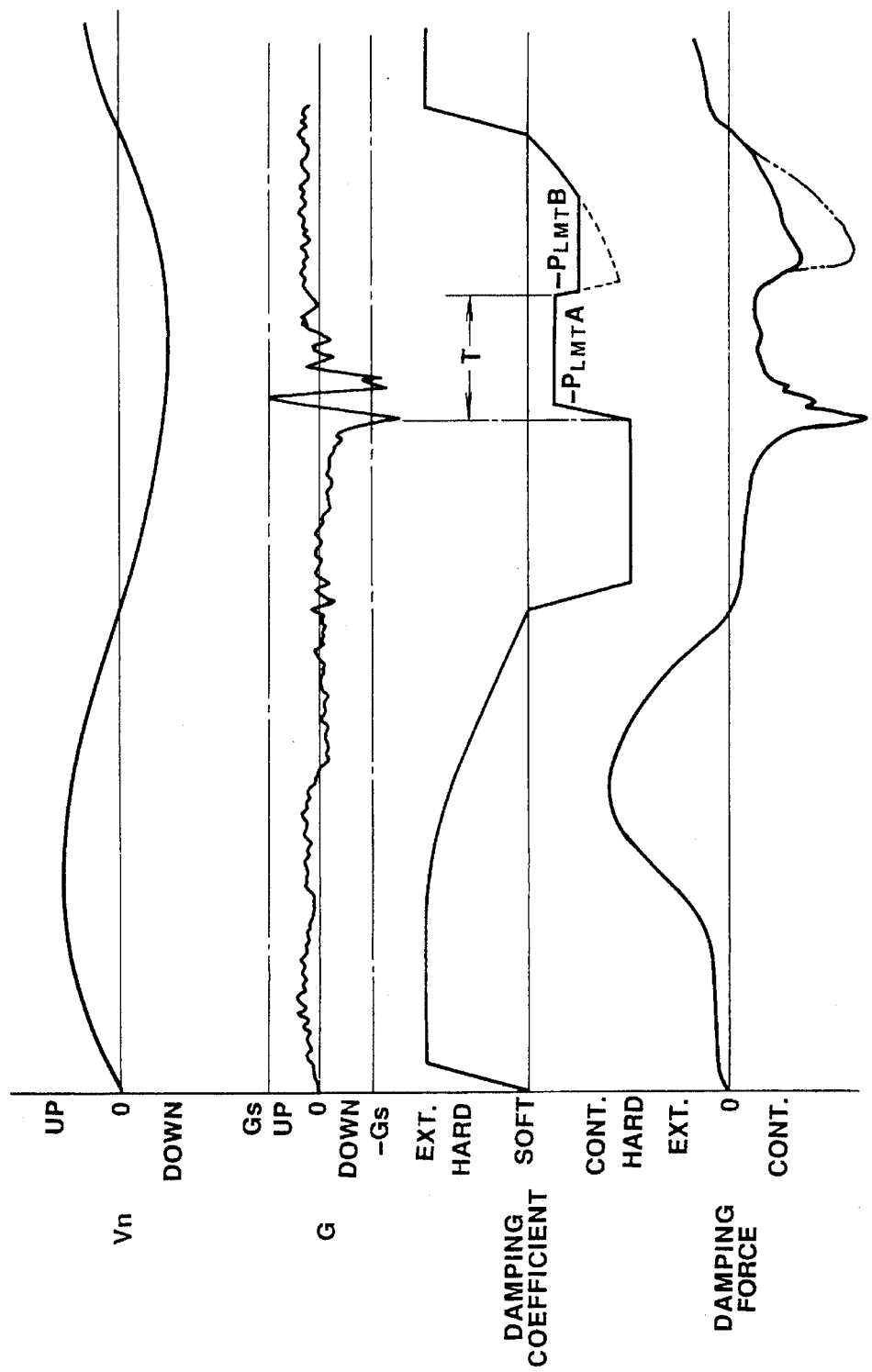
FIG. 33 is a timing chart for explaining the operation of a sixth preferred embodiment of the suspension control system according to the present invention.
Figure 34:
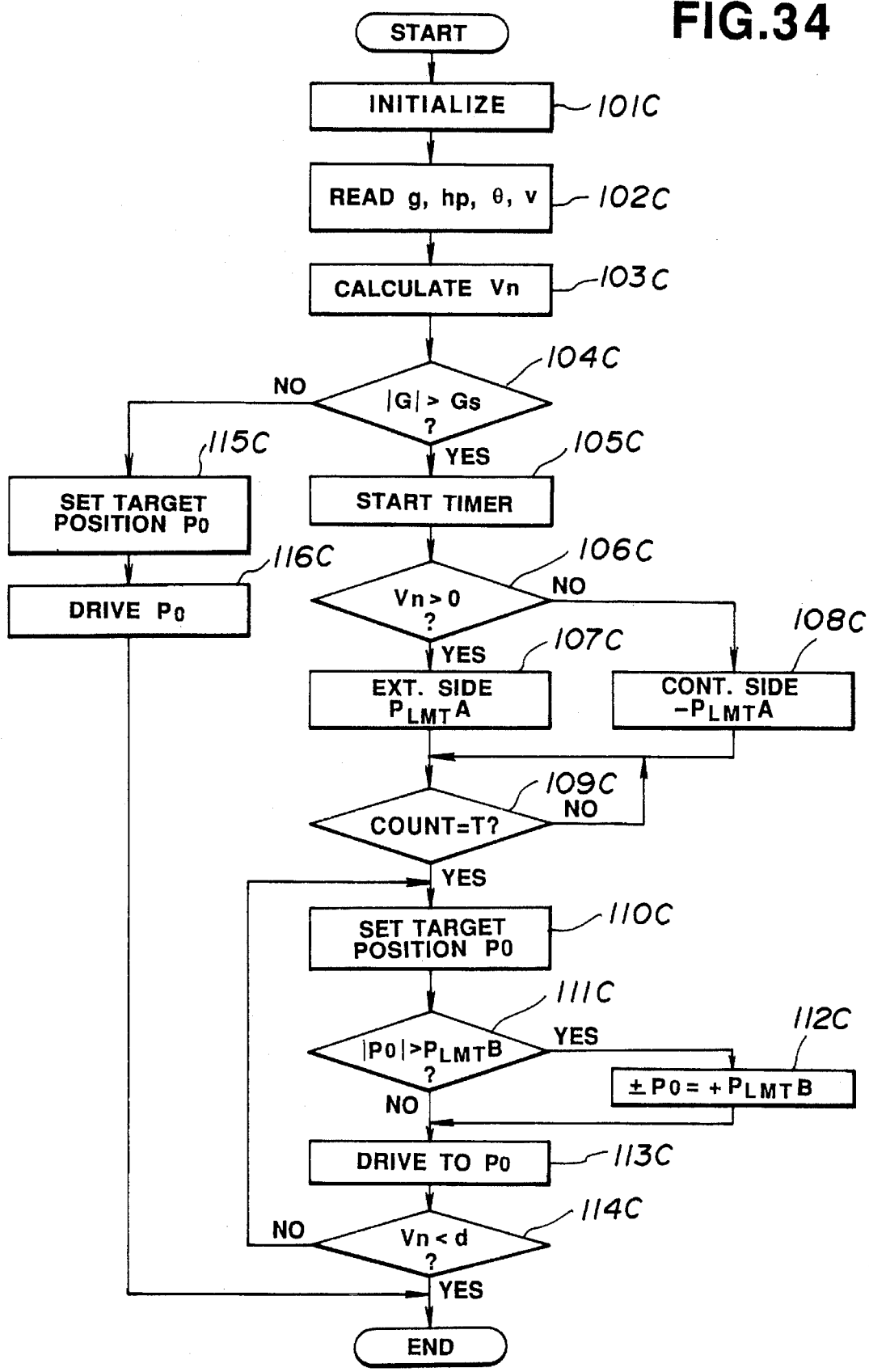
FIG. 34 is an operational flowchart executed by the control unit in the sixth preferred embodiment.

FIGS. 33 and 34 show timing chart and operational flow chart of the control unit 4 in a sixth preferred embodiment of the suspension control system according to the present invention.

The structures of each shock absorber SA and the other elements in the sixth preferred embodiment are already described in the first preferred embodiment.

In a step 101C of FIG. 34, the CPU 4b initializes.

In a step 102C, the CPU 4b reads the vertical acceleration g, high pass filtered signal $h_p$, steering angle $\theta$, and vehicle speed v.

In a step 103C, the CPU 4b integrates the vertical acceleration g to derive the sprung mass speed $V_n$.

In a step 104C, the CPU 4b determines whether the absolute value of the vertical acceleration G derived through the high pass filtered signal $h_p$ exceeds the predetermined threshold value $G_s$. If YES in the step 104C, the routine goes to a step 105C. If NO in the step 104C, the routine goes to a step 113C. The threshold value $G_s$ used in the sixth preferred embodiment is a value normally input during the vehicular run on the flat road. When the input thereof occurs in the vehicle body, the value is set to a value having a magnitude such a vehicular comfort as to give unpleasant feeling to the vehicular occupant.

In a step 105C, a counter of a timer installed in the internal of the control unit 4 is cleared and, thereafter, the measurement of the predetermined time T is started according to the timer start. Then, the routine goes to a step 106C.

In the step 106C, the CPU 4b determines whether the sprung mass speed $V_n$ indicates positive.

If YES in the step 106C, the routine goes to a step 107C and, if NO in the step 107C, the routine goes to a step 108C.

In the step 107C, the CPU 4b and drive circuit 4c set the target damping coefficient at the extension stroke side to the predetermined low damping coefficient $P_{LMT}A$. Thereafter, the routine goes to a step 109B.

On the other hand, in the step 108C, the CPU 4b is and drive circuit 4c changes the target damping coefficient at the contraction stroke side to a predetermined damping coefficient $-P_{LMT}A$ and, thereafter, the routine goes to a step 109C.

In the step 109C, the CPU 4b determines whether the count value of the timer indicates a predetermined time T. If YES in the step 109C, the routine goes to a step 110C. If NO, the routine returns to the seep 109C.

In the step 110C, the CPU 4b executes the set of the target damping coefficient on the basis of the sprung mass speed $V_O$ (target damping position). Thereafter, the routine goes to a step 111C.

The target damping position $P_0$ is set on the basis of such an equation as $$P_0 = C_x (X_1 - X_0) = X_1.$$

It is noted that $P_0$: target damping position (corresponds to the number of steps of the pulse motor 3 and to the damping force), C: damping coefficient, $X_1$: sprung mass speed, and $X_0$: unsprung mass speed.

In the step 111C, the CPU 4b determines whether the target position $P_0$ is larger than a limited position $P_{LMT}B$ of the predetermined low damping coefficient. If YES in the step 111C, the routine goes to a step 112C. If NO in the step 111C, the routine goes to a step 113C.

In the step 112C, the CPU 4b sets the target position $P_0$ to the limit position $P_{LMT}B$.

In the step 113C, the CPU 4b drives the pulse motor 3 so as to provide the target position $P_0$ for the shock absorber SA.

In the step 114C, the CPU 4b determines whether the sprung mass speed $V_0$ is below the predetermined threshold value d. If YES in the step 114C, once flow is ended. If NO in the step 114C, the routine goes to a step 110C.

In the step 115C, the CPU sets the target position $P_0$ on the basis of the sprung mass speed $V_0$. Then, the routine goes to a step 116C.

In the step 116C, the CPU 4b and drive circuit 4c drive the pulse motor 3 so as to provide the target position for the shock absorber SA.

Next, the operation of the sixth preferred embodiment will be described with reference to the flowchart of FIG. 33.

As shown in FIG. 33, when the sprung mass speed $V_0$ indicating a sinusodial wave changes moderately, in the steps 115C and 116C execute the change in the damping coefficient. In the midway through the change described above, when the sprung mass acceleration G indicated by the high pass filtered signal $h_p$ abruptly changes due to a projection on the road surface, the damping coefficients are reduced to the predetermined damping coefficients $\pm P_{LMT}A$ until a predetermined time has passed on the basis of the executions in the steps 104C through 118C.

Hence, if, during the control of the shock absorber SA toward the high damping coefficient, an impulse formed large road surface input occurs due to the projection on the road surface, the damping coefficient(s) is immediately reduced during the predetermined time T. Therefore, the vehicular comfort can be assured. In addition, since the determination of whether the road surface input is large or not is based on the high pass filtered signal derived from the vertical G sensor 1 from which the sprung mass resonant frequency component is eliminated.

Therefore, the influences of vibrations at the sprung mass such as diving or squat does not receive. The control reflecting accurately the behaviors on the unsprung mass can be carried out.

Thereafter, when the predetermined time T has passed, the normal control correspond to the sprung mass speed $V_n$ is resumed in the step 110C. If the target position $P_0$ achieved as the result of control provides the higher damping force than the limit position $\pm P_{LMT}B$, the damping coefficient is limited to the limit position $\pm P_{LMT}B$. If less than $\pm P_{LMT}B$, the damping coefficients are the target positions $P_0$.

Hence, the shock absorber SA does not provide the large and abrupt change from the low damping coefficient controlled state to a larger damping coefficient than the limit position $P_{LMT}B$. Consequently, the grounding stability of the tire wheels and vehicular comfort can be assured. It is noted that a phantom line in FIG. 33 denotes the result of control executed according to the previously proposed suspension control system. As shown by the solid line of the damping force in FIG. 33, the abrupt change of the damping force can be prevented.

In the sixth preferred embodiment, the high pass filter 4d is used. However, the high pass filter may be eliminated so that the vehicular comfort for impulse input of the road surface and grounding stability for the abrupt change in the damping coefficient can be prevented from being worsened.

Although, in the sixth preferred embodiment, the control on the basis of the sprung mass speed is carried out, means for controlling the suspension damping coefficient according to the coincidence or non-coincidence between the sign of the sprung mass speed and that of a relative speed between the sprung mass and unsprung mass or means for changing the control gain according to the vehicle speed may be used.

Effect of the Present Invention

In the first and second preferred embodiments, when the vehicle body occurs the rolling, the rolling control such that each shock absorber carries out the rolling control such that the shock absorbers SA provide the high damping coefficients and when the sprung mass acceleration value passed through the high pass filter exceeds the threshold value during the rolling control, the correction controls such that the damping coefficients for the respective shock absorbers are reduced to the predetermined damping coefficients are carried out independently for the respective tire wheels. Therefore, when the high frequency input occurs from the road surface during the rolling control, the damping coefficients for the corresponding shock absorber are reduced and the vehicle comfort can be assured. In addition, since the damping coefficients for only the shock absorber installed on one of the tire wheels from which the high frequency input occurs arc varied, the rolling suppression function can be assured with the reduction of the rolling suppression effect due to the reduction of the damping coefficients held at minimum. That is to say, a compatibility between the rolling suppression effect and improvement in the vehicular comfort can be assured.

In the third and fourth preferred embodiments, when the vibrations on the unsprung mass are not so severe, the control such that the sprung mass vibrations are suppressed according to the sprung mass speed is carried out. When the unsprung mass vibrations are severe, the control is carried out such that the vehicular comfort is improved with the accurate grasping of the severe unsprung mass vibrations grasped so that the unsprung mass vibrations are not transmitted. Therefore, the steering stability and vehicular comfort can be assured.

In the fifth preferred embodiment, when the vibrations on the unsprung mass are not so severe (violent), the vibration suppression control such that the corresponding shock absorber suppresses the stroke motion having the same direction as the sprung mass speed by the high damping coefficient in proportion to the sprung mass speed. On the other hand, when the vibrations on the unsprung mass are severe (violent), the vehicle comfort improvement control such that the vibrations on the unsprung mass arc absorbed by means of the low damping coefficients so as to prevent the transmission of the vibrations on the unsprung mass to the sprung mass is carried out and the steering stability improvement control such that the follow-up of the unsprung mass to the variations in the road surface condition is facilitated so as to improve the grounding stability of the tire wheels. Since the damping coefficient immediately after or immediately before the end of the switching of the stroke motion is made in proportion to the sprung mass speed, the control such that the smooth change in the damping coefficient can be carried out. Therefore, the compatibility between the steering stability and vehicular comfort can be assured. In addition, the fast responsive characteristic of the damping coefficient changing control can be assured.

In the sixth preferred embodiment, when the sprung mass acceleration exceeds either of the predetermined threshold values, the damping coefficients below the predetermined damping coefficients are held for the predetermined time and, after the pass of the predetermined time, the damping coefficient control based on the input of the vehicular behavior detecting means is resumed. After the resume of the damping coefficient control the high damping coefficient limit block is installed such that the damping coefficient is limited to the coefficient at the low damping side below the predetermined low damping coefficient until the sprung mass speed is reduced below the predetermined threshold value. Therefore, if the impulsive input due to the presence of the projection on the flat road occurs, the high damping coefficient control is limited for the predetermined time so that the vehicular comfort can be assured. After the improvement control of the vehicular comfort described above is carried out so as to change the present damping coefficient to the low damping coefficient and the return to the normal suspension control is executed, the limitation on the change to the high damping coefficient is carried out so that the abrupt damping force can be suppressed and both grounding stability and vehicular comfort can be improved.

In the way as described above, the suspension control system according to the present invention can assure the compatibility of steering stability and vehicular comfort. In addition, the fast responsive characteristic can also be assured. Furthermore, various effects can be achieved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A suspension control system for an automotive vehicle, comprising:
    a) at least one shock absorber, interposed between a vehicle body as a sprung mass and a tire wheel as an unsprung mass, having a piston member and a damping coefficient varying means therein, said damping coefficient varying means operatively changing its position in response to a control signal so that a damping coefficient of at least one of extension and contraction strokes of the piston member is set to a target damping coefficient exhibiting position;
    b) at least one sprung mass acceleration detecting means for detecting a vertical sprung mass acceleration and outputting a vertical sprung mass acceleration signal indicative thereof;
    c) high pass filtering means, having a predetermined cut-off frequency, for eliminating a lower frequency component of the vertical sprung mass acceleration indicative signal derived from said sprung mass acceleration detecting means than the predetermined cut-off frequency, said lower frequency component including a sprung mass resonance frequency component, and for passing a higher frequency component of the vertical sprung mass acceleration indicative signal from said vertical sprung mass acceleration detecting means than the predetermined cut-off frequency, said higher frequency component including an unsprung mass resonance frequency component;
    d) at least one sprung mass vertical velocity detecting means for detecting a sprung mass vertical velocity and for outputting a sprung mass vertical velocity signal indicative thereof;
    e) setting means for previously setting a predetermined threshold value for the high pass filtered vertical sprung mass acceleration indicative signal;
    f) determining means for determining whether a value of the vertical sprung mass acceleration indicative signal passed through said high pass filtering means and derived from said sprung mass acceleration detecting means is below the predetermined threshold value; and
    g) controlling means for outputting the control signal to the damping coefficient varying means according to a result of determination of the determining means and according to a direction of the sprung mass vertical velocity signal so as to control the damping coefficient of either of extension and contraction stroke sides which is the same direction as that of the vertical sprung mass velocity signal derived from said sprung mass vertical velocity detecting means to the target damping coefficient position.

2. A suspension control system for an automotive vehicle as set forth in claim 1, which further includes:
    a steering angular displacement sensor, disposed on a steering wheel of the vehicle, for detecting a steering angular displacement of the steering wheel with respect to a neutral position of the steering wheel and outputting a steering angular displacement signal indicative thereof;
    a vehicle speed sensor for detecting a vehicle speed and outputting a vehicle speed signal indicative thereof; and
    rolling control state detecting means for deriving a steering angular displacement velocity on the basis of the steering angular displacement indicative signal of the steering angular displacement sensor and for determining whether a rolling control state occurs on the sprung mass on the basis of the derived steering angular displacement velocity and the vehicle speed signal derived from said vehicle speed sensor;
    said controlling means having means for controlling said damping coefficient varying means in a rolling mode when said rolling control state detecting means determines that the vehicle is in said rolling control state, and for controlling said damping coefficient varying means in a normal mode when the vehicle is determined not to be in said rolling control state.

3. A suspension control system for an automotive vehicle as set forth in claim 2, which further includes a rolling direction determining means for determining a direction in which the rolling occurs, wherein said vertical sprung mass acceleration determining means includes first means for determining whether an absolute value of the high pass filtered signal ($h_p$) exceeds the predetermined threshold value (k), and wherein the control signal output by said control means to the damping coefficient varying means is based on the determined rolling direction and whether the absolute value of the high pass filtered signal ($h_p$) exceeds the predetermined threshold value (k).

4. A suspension control system for an automotive vehicle as set forth in claim 3, wherein the vehicle is provided with two right and two left shock absorbers for two right and two left tire wheels respectively, and wherein when the rolling direction is right and the absolute value of the high pass filtered signal ($h_p$) is larger than the predetermined threshold value (k), the controlling means executes the following control for the right shock absorbers and for the left shock absorbers:
    for each of the right shock absorbers, the damping coefficient at the contraction stroke is set to a medium damping coefficient position (M) and the damping coefficient at the extension stroke is set to a soft damping coefficient position (S), and for each of the left shock absorbers, the damping coefficient at the contraction stroke is set to the soft damping coefficient position and the damping coefficient at the extension stroke is set to the medium position (M);
    wherein when the rolling direction is right and the absolute value of the high pass filtered signal ($h_p$) is less than the predetermined threshold value, the controlling means executes the following control for the right shock absorbers and for the left shock absorbers:

- for each of the right shock absorbers, the damping coefficient at the contraction stroke is set to a hard damping coefficient position (H) and the damping coefficient at the extension stroke is set to the soft damping coefficient position (S), and for each of the left shock absorbers, the damping coefficient at the contraction stroke is set to the soft position (S) and the damping coefficient at the extension stroke is set to the hard position (H);

wherein when the rolling direction is left and the absolute value of the high pass filtered signal ($h_p$) is above the predetermined threshold value (k), the controlling means executes the following control for the right shock absorbers and left shock absorbers:

for each of the right shock absorbers, the damping coefficient at the contraction stroke is set to the soft damping position (S) and the damping coefficient at the extension stroke is set to the medium damping position (M), and for each of the left shock absorbers, the damping coefficient at the contraction stroke is set to the medium damping coefficient position and the damping coefficient at the extension stroke is set to the soft damping position (S);

and wherein, when the rolling direction is left and the absolute value of the high pass filtered signal ($h_p$) is less than the predetermined threshold value (k), the controlling means executes the following control for the right and left shock absorbers:

for each of the right shock absorbers, the damping coefficient at the contraction stroke is set to the soft damping position (S) and the damping coefficient at the extension stroke is set to the hard damping position (H), and for each of the left shock absorbers, the damping coefficient at the contraction stroke is set to the hard position and the damping coefficient at the extension stroke is set to the soft damping position (S).

5. A suspension control system for an automotive vehicle as set forth in claim 3, wherein, when the rolling direction is right and the absolute value of the high pass filtered signal ($h_p$) is larger than the predetermined threshold value (k), the controlling means executes the following control:

the damping coefficients at both contraction and extension strokes for all four shock absorbers are set to medium damping coefficient positions (M);

wherein, when the rolling direction is right and the absolute value of the high pass filtered signal ($h_p$) is less than the predetermined threshold value (k), the controlling means executes the following control:

the damping coefficients at both contraction and extension strokes for all four shock absorbers are set to the hard damping coefficient positions (H);

wherein, when the rolling direction is left and the absolute value of the high pass filtered signal ($h_p$) is above the predetermined threshold value k, the controlling means executes the following control:

the damping coefficients at both extension and contraction strokes for all four shock absorbers are set to the medium damping coefficient positions (M); and wherein, when the rolling direction is left and the absolute value of the high pass filtered signal ($h_p$) is less than the predetermined threshold value (k), the controlling means executes the following control:

the damping coefficients at both contraction and extension strokes for all four shock absorbers are set to the hard damping coefficient positions (H).

6. A suspension control system for an automotive vehicle as set forth in claim 1, wherein, when the high pass filtered vertical sprung mass acceleration signal value is below the predetermined threshold value, the controlling means outputs the control signal to the damping coefficient varying means so that the damping coefficient at one of the strokes which has the same direction as the sprung mass vertical speed is set to a relatively high damping coefficient position and wherein, when the high pass filtered vertical sprung mass acceleration signal value is above the predetermined threshold value, the controlling means outputs the control signal to the damping coefficient varying means so that the damping coefficient at one of the strokes which has the same direction as the sprung mass vertical speed is set to a predetermined relatively low damping coefficient until the direction of the sprung mass vertical speed is reversed.

7. A suspension control system for an automotive vehicle as set forth in claim 6, wherein said sprung mass vertical speed detecting means detects a magnitude and direction of the vertical sprung mass vertical speed according to the vertical sprung mass acceleration signal derived from the vertical sprung mass acceleration sensor.

8. A suspension control system for an automotive vehicle as set forth in claim 7, which further includes; a vehicle speed detecting means for detecting the vehicle speed and outputting a vehicle speed signal indicative thereof and wherein the threshold value setting means varies and sets the predetermined threshold value according to the vehicle speed.

9. A suspension control system for an automotive vehicle as set forth in claim 8, wherein said controlling means includes: first means for determining whether an absolute value G1 of the high pass filtered vertical sprung mass acceleration value is below the predetermined threshold value; and second means for determining whether a sign of the sprung mass vertical speed V0 indicates a plus + when the first means determined that the absolute value of G1 is below the predetermined threshold value and wherein said controlling means outputs the control signal to the damping coefficient varying means so that the damping coefficient at the extension stroke is controlled to provide the relatively high damping coefficient $P_T$ when the sign of the sprung mass vertical speed V0 indicates plus; and wherein said controlling means outputs the control signal to the damping coefficient varying means so that the damping coefficient at the contraction stroke is controlled to provide the relatively high damping coefficient $P_C$ when the sign of the sprung mass vertical speed V0 indicates minus.

10. A suspension control system for an automotive vehicle as set forth in claim 9, wherein the damping coefficient at the other of the strokes at which the control to the relatively high damping coefficient is not carried out is set to a predetermined low damping coefficient.

11. A suspension control system for an automotive vehicle as set forth in claim 10, wherein said controlling means calculates the relatively high damping coefficients $P_T$ and $P_C$ according to the following sequence:

setting a proportion region (b——b) for the sprung mass vertical speed V0;

equally dividing the proportion region (b——b) by a number of stages the damping coefficient is variably set with the proportion region being the maximum when the sprung mass vertical speed falls in the proportion region so that either of the damping coefficients $P_T$ and $P_C$ is stepwisely changed in proportion to the sprung mass vertical speed V0; and, on the other hand, when the sprung mass vertical speed falls out of the proportion region (b—b), the damping coefficient is fixed to a maximum damping coefficient of the shock absorber, and when the direction of sprung mass vertical speed V0 is falling from a point of inflection into the proportion region, either of the damping coefficients $P_T$ and $P_C$ is stepwise reduced in proportion to the sprung mass vertical speed with the magnitude of the sprung mass vertical speed at the point of inflection equally divided by the number of stages the damping coefficient is variably set.

12. A suspension control system for an automotive vehicle as set forth in claim 11, wherein the proportion region is stepwisely varied in reverse proportion to the vehicle speed $V_1$.

13. A suspension control system for an automotive vehicle as set forth in claim 10, wherein the damping coefficients at both extension and contraction strokes are changed at three stages of the relatively high damping coefficient position at the extension stroke and relatively low damping coefficient position at the contraction stroke; the relatively low damping coefficient positions at both extension and contraction strokes; and the relatively low damping position at the extension stroke and the relatively high damping coefficient position at the contraction stroke.

14. A suspension control system for an automotive vehicle as set forth in claim 1, wherein said high pass filtering means includes a high pass filter which passes only a high frequency component of the vertical sprung mass acceleration signal derived from the vertical sprung mass acceleration detecting means from which low frequency components including a sprung mass resonant frequency component are cut off so as to provide the vertical sprung mass acceleration signal value therethrough.

15. A suspension control system for an automotive vehicle as set forth in claim 14, wherein said determining means determines whether the high pass filtered vertical sprung mass acceleration signal value G1 is below the predetermined threshold value ±g and said controlling means outputs the control signal to the damping coefficient varying means so that the damping coefficient at one of the strokes whose direction is the same as that of the sprung mass vertical speed is controlled to provide a higher damping coefficient position in proportion to the magnitude of the sprung mass vertical speed.

16. A suspension control system for an automotive vehicle as set forth in claim 15, which further includes another determining means for determining whether the magnitude of the sprung mass vertical speed V0 is below another predetermined threshold value $V_n$ and wherein, when the high pass filtered vertical sprung mass acceleration signal value G1 is above the predetermined threshold value g, said controlling means outputs the control signal to the damping coefficient varying means so that the damping coefficient at one of the strokes whose direction is the same as that of the sprung mass vertical speed is controlled to provide a predetermined low damping coefficient position $+X_n$ position until the direction of the sprung mass vertical speed is reversed when said another determining means determines that the magnitude of the sprung mass vertical speed is above the another predetermined threshold value and said controlling means outputs the control signal to the damping coefficient varying means so that the damping coefficient at one of the strokes whose direction is the same as that of the sprung mass vertical speed is controlled to provide a damping coefficient position in proportion to the magnitude of the sprung mass vertical speed with the predetermined low damping coefficient as the maximum when the magnitude of the sprung mass vertical speed is below the another predetermined threshold value.

17. A suspension control system for an automotive vehicle as set forth in claim 16, wherein said controlling means outputs the control signal to said damping coefficient varying means so that the damping coefficient at the extension stroke whose direction is the same as that of the sprung mass vertical speed is controlled to provide the higher damping coefficient position X as follows when the high pass filtered vertical sprung mass acceleration signal value is above the predetermined value g and the direction of the sprung mass vertical speed is positively larger than the other predetermined threshold value until the direction of the sprung mass vertical speed becomes minus:

$$X=(V0/V_n)\times(+X_n).$$

18. A suspension control system for an automotive vehicle as set forth in claim 17, wherein said controlling means outputs the control signal to said damping coefficient varying means so that the damping coefficient at one of the strokes whose direction is the same as that of the sprung mass vertical speed is controlled to provide the damping coefficient position X as expressed below until the direction of the sprung mass vertical speed becomes negative when the high pass filtered vertical sprung mass acceleration signal G, is above the predetermined threshold value g, the direction of the sprung mass vertical speed V0 is minus, and the magnitude of the sprung mass vertical speed V0 is minus, and the magnitude of the other threshold value $V_n$:

$$X=(V0/V_n)\times(-X_n)$$

and, in addition, said controlling means outputs the control signal to the damping coefficient varying means so that the damping coefficient thereat is controlled to provide the damping coefficient position $-X_n$ when the magnitude of the sprung mass vertical speed V0 the magnitude of the other threshold value $V_n$.

19. A suspension control system for an automotive vehicle as set forth in claim 1, which further includes a timer which counts a predetermined period of time when the high pass filtered vertical sprung mass acceleration signal G exceeds the predetermined threshold value Gs and wherein, when the vertical sprung mass acceleration is above the predetermined threshold value, said controlling means outputs the control signal to the damping coefficient varying means so that the damping coefficient at one of the strokes whose direction is the same as that of the sprung mass vertical speed is controlled to provide a predetermined low damping coefficient position $(+P_{LMT}A)$ when the direction of the sprung mass vertical speed is upward with respect to the vehicle body and said controlling means outputs the control signal to the damping coefficient varying means so that the damping coefficient at the other stroke whose direction is opposite to that of the sprung mass vertical speed is controlled to another predetermined low damping coefficient position $(-P_{LMT}A)$ when the direction of the sprung mass vertical speed is downward, both controls being executed by the controlling means until the predetermined period of time counted by the timer has passed.

20. A suspension control system for an automotive vehicle as set forth in claim 19, wherein, after the predetermined period of time has passed, the controlling means sets a target damping coefficient position Po according to the sprung mass vertical speed as follows:

$$Po=C.XI,$$

wherein C denotes the present damping position and XI denotes the sprung mass vertical speed.

21. A suspension control system for an automotive vehicle as set forth in claim 20, which further includes another determining means for determining whether the sprung mass vertical speed is below another predetermined threshold value (d) and wherein the control of the controlling means according to the sprung mass vertical speed toward the target damping coefficient position is executed until the sprung mass vertical speed V0 is below another predetermined threshold value (d).

22. A suspension control system for an automotive vehicle as set forth in claim 21, which Further includes another determining means for determining whether the target damping position $P_0$ is higher than a limit damping position $\pm P_{LMT}B$, after the predetermined period of time has passed, and wherein the target damping position is set to the limit damping position $\pm P_{LMT}B$ when $|P_0| > \pm P_{LMT}B$.

23. A suspension control system for an automotive vehicle as set forth in claim 1, wherein said damping coefficient varying means includes an adjuster which operatively adjusts a flow passage area of a communication hole which communicates a fluid between an upper fluid chamber and lower fluid chamber, both chambers being defined by the piston member, according to the control signal and a pulse motor which rotates and adjusts the position of the adjuster according to the control signal derived from said controlling means.

24. A method for controlling damping force characteristics of at least one stroke side of a vehicular shock absorber, said shock absorber being interposed between a sprung mass and an unsprung mass, having a vertically movable piston member and an adjuster which is so constructed and arranged as to vary its position to vary a damping force coefficient at either side of the strokes of the piston member in response to a control signal so that the damping coefficient of either of extension and contraction stroke sides of the piston member is set to a desired damping coefficient position, said method comprising the steps of:

a) detecting a vertical acceleration of the sprung mass and outputting a sprung mass acceleration indicative signal;

b) determining a vertical sprung mass velocity on the basis of the sprung mass acceleration indicative signal and outputting a vertical sprung mass velocity indicative signal;

c) eliminating a lower frequency component, including a sprung mass resonance frequency, from the sprung mass acceleration indicative signal detected in step a), said lower frequency component having a lower frequency than a predetermined cut-off frequency of a high pass filter, and passing only a higher frequency component, including an unsprung mass resonance frequency, from the sprung mass acceleration indicative signal detected in step a), said higher frequency component having a higher frequency than the predetermined cut-off frequency of the high pass filter;

d) setting a predetermined threshold value for the sprung mass acceleration indicative signal passed through said high pass filter;

e) determining whether an amplitude of said sprung mass acceleration indicative signal passed through said high pass filter is below the predetermined threshold value; and f) outputting the control signal to the adjuster via a pulse motor connected to the adjuster in accordance with a result of the determination in step e) and in accordance with a direction of the vertical sprung mass velocity detected in step b) so as to control the damping coefficient to the desired damping coefficient position.

25. A method for controlling damping force characteristics as set forth in claim 24, wherein in step f) the control signal is output to the adjuster via the pulse motor so as to control either of the stroke sides of the piston member whose stroke direction is the same as the vertical sprung mass velocity signal determined in step b) to provide a predetermined relatively high damping force coefficient when the amplitude of the sprung mass acceleration indicative signal passed though the high pass filter is determined in step e) to be below the predetermined threshold value, and wherein when the amplitude of the sprung mass acceleration indicative signal passed through the high pass filter is determined in step e) to be equal to or above the predetermined threshold value, the control signal is output in step f) to the adjuster via the pulse motor so as to control either of the stroke sides of the piston member whose stroke direction is the same as the vertical sprung mass velocity signal determined in step b) to provide a predetermined relatively low damping coefficient until the direction of the vertical sprung mass velocity indicative signal determined in step b) is reversed.

26. A method for controlling damping force characteristics as set forth in claim 25, wherein said predetermined relatively high damping force coefficient is in proportion to a magnitude of the vertical sprung mass velocity signal determined in step b), wherein said predetermined relatively low damping coefficient is fixed as a lowest damping force coefficient until the direction of the vertical sprung mass velocity indicative signal determined in step b) is reversed and while the magnitude of the vertical sprung mass velocity indicative signal is equal to or above another predetermined threshold value, and wherein, until the direction of the vertical sprung mass velocity indicative signal determined in step b) is reversed and while the magnitude of the vertical sprung mass velocity indicative signal is below the another predetermined threshold value, the damping coefficient of the corresponding stroke side of the piston member which is the same direction as the sprung mass acceleration indicative signal passed through the high pass filter is in proportion to the magnitude of the vertical sprung mass velocity indicative signal with said predetermined low damping coefficient as a maximum value.

27. A method for controlling damping force characteristics as set forth in claim 24, wherein, when the amplitude of the high pass filtered sprung mass acceleration indicative signal is determined in step e) to be in excess of the predetermined threshold value, the damping force coefficient at the controlled stroke side is held at a lower damping force coefficient than a predetermined relatively low damping force coefficient for a predetermined period of time, and, after said predetermined period of time has passed, the damping force coefficient control is resumed on the basis of the vertical sprung mass velocity indicative signal, and wherein, after the resumption of the damping force coefficient control, the damping force coefficient at the controlled stroke side is limited to the lower damping force coefficient position than the predetermined relatively low damping force coefficient until the magnitude of the vertical sprung mass velocity indicative signal determined in step b) is equal to or below another predetermined threshold value for the vertical sprung mass velocity indicative signal.

28. A method for controlling damping force characteristics as set forth in claim 24, wherein said shock absorber comprises a plurality of shock absorbers interposed between a vehicle body and a corresponding vehicular tire wheel, the method further comprising the steps of:

g) detecting a rolling state of the vehicle body;

h) carrying out a rolling motion suppression control when the rolling state is detected in step g) by outputting the control signals to respective adjusters of the shock absorbers via corresponding pulse motors so that the damping force coefficient at the controlled stroke side is at a relatively high damping coefficient.

29. A method for controlling damping force characteristics as set forth in claim 28, wherein when any one of the sprung mass acceleration signals passed through the high pass filter has exceeded the corresponding predetermined threshold value during the execution of the rolling motion suppression control in step h), a correction control is executed such that the relatively high damping force coefficient of the control side of the corresponding one of the shock absorbers is corrected and reduced to a predetermined damping force coefficient lower than the relatively high damping force coefficient while the rolling motion in the direction toward the corresponding one of the shock absorbers is being carried out.

* * * * *